US010599932B2

(12) United States Patent
Demos

(10) Patent No.: US 10,599,932 B2
(45) Date of Patent: Mar. 24, 2020

(54) PERSONAL ELECTRONIC DEVICE FOR PERFORMING MULTIMODAL IMAGING FOR NON-CONTACT IDENTIFICATION OF MULTIPLE BIOMETRIC TRAITS

(71) Applicant: Lawrence Livermore National Security, LLC, Livermore, CA (US)

(72) Inventor: Stavros Demos, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 125 days.

(21) Appl. No.: 14/735,028

(22) Filed: Jun. 9, 2015

(65) Prior Publication Data

US 2015/0356362 A1    Dec. 10, 2015

Related U.S. Application Data

(63) Continuation-in-part of application No. 14/299,867, filed on Jun. 9, 2014.

(51) Int. Cl.
*G06K 9/20* (2006.01)
*G06K 9/00* (2006.01)

(52) U.S. Cl.
CPC ..... *G06K 9/00885* (2013.01); *G06K 9/00013* (2013.01); *G06K 9/00892* (2013.01); *G06K 9/2018* (2013.01); *G06K 2009/00932* (2013.01)

(58) Field of Classification Search
USPC .......................................................... 348/77
See application file for complete search history.

(56) References Cited

U.S. PATENT DOCUMENTS

| | | | |
|---|---|---|---|
| 5,929,443 | A | 7/1999 | Alfano et al. |
| 6,032,070 | A | 2/2000 | Flock et al. |
| 7,174,036 | B2 | 2/2007 | Ohba |
| 7,289,211 | B1 | 10/2007 | Walsh, Jr. et al. |
| 7,347,365 | B2 | 3/2008 | Rowe |
| 7,792,337 | B2 | 9/2010 | Higuchi |
| 7,831,072 | B2 | 11/2010 | Rowe |

(Continued)

FOREIGN PATENT DOCUMENTS

| | | |
|---|---|---|
| JP | 2012164357 A | 8/2012 |
| WO | 2006073450 A2 | 7/2006 |

*Primary Examiner* — Mikhail Itskovich
(74) *Attorney, Agent, or Firm* — Harness, Dickey & Pierce, PLC

(57) ABSTRACT

A hand holdable, portable apparatus for imaging a portion of an anatomy of a person, without physical contact with the anatomy. The apparatus has a housing, a touchscreen display mounted in the housing, and a plurality of illumination modules disposed on the housing and configured to provide illumination beams at different wavelengths and having different polarizations. A camera is supported on the housing and forms an imaging subsystem for capturing a plurality of acquired images produced by illumination from the illumination modules. A processing subsystem analyzes the acquired images and generates a new image which has enhanced contrast of features associated with at least one of a surface biometric trait of the portion of the anatomy, and/or a subsurface biometric trait of the portion of the anatomy. This image(s) can be used for verification of the person's identity by software incorporated in the portable apparatus or by transmitting information generated by the images to a remote data base.

15 Claims, 15 Drawing Sheets

(56) References Cited

U.S. PATENT DOCUMENTS

| | | |
|---|---|---|
| 8,300,903 B2 | 10/2012 | Higuchi |
| 8,661,516 B2 | 2/2014 | Yamada |
| 8,719,584 B2 * | 5/2014 | Mullin .................. G06F 1/1626 713/182 |
| 8,887,259 B1 | 11/2014 | Harding |
| 2002/0016533 A1 | 2/2002 | Marchitto et al. |
| 2007/0207681 A1 | 9/2007 | Zabroda et al. |
| 2008/0049982 A1 | 2/2008 | Nagasaka et al. |
| 2009/0137908 A1 * | 5/2009 | Patwardhan ......... A61B 5/0059 600/476 |
| 2011/0064282 A1 | 3/2011 | Abramovich et al. |
| 2011/0085708 A1 | 4/2011 | Martin et al. |
| 2011/0129128 A1 | 6/2011 | Makimoto et al. |
| 2011/0150304 A1 | 6/2011 | Abe et al. |
| 2012/0102332 A1 | 4/2012 | Mullin |
| 2012/0250954 A1 | 10/2012 | Nada et al. |
| 2014/0310786 A1 | 10/2014 | Harding |

\* cited by examiner

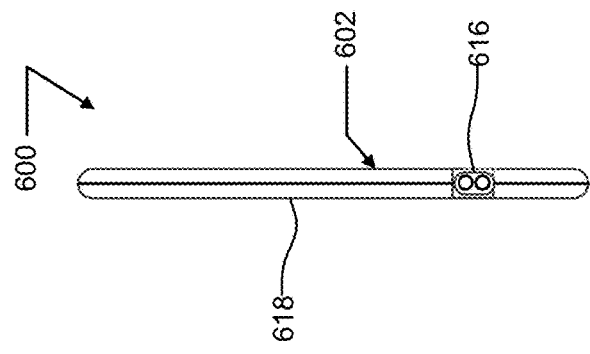
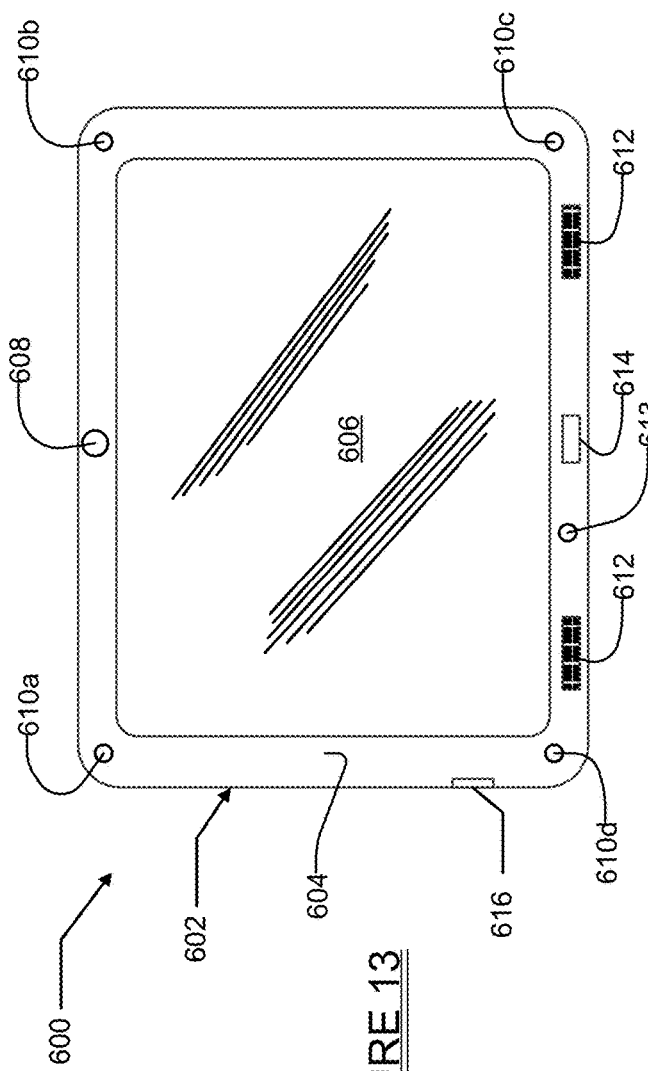
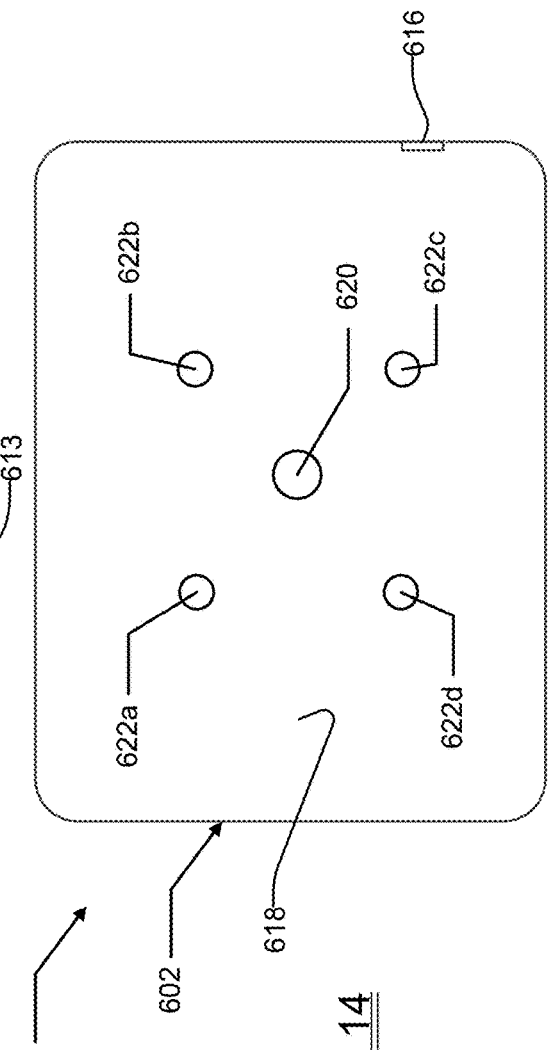

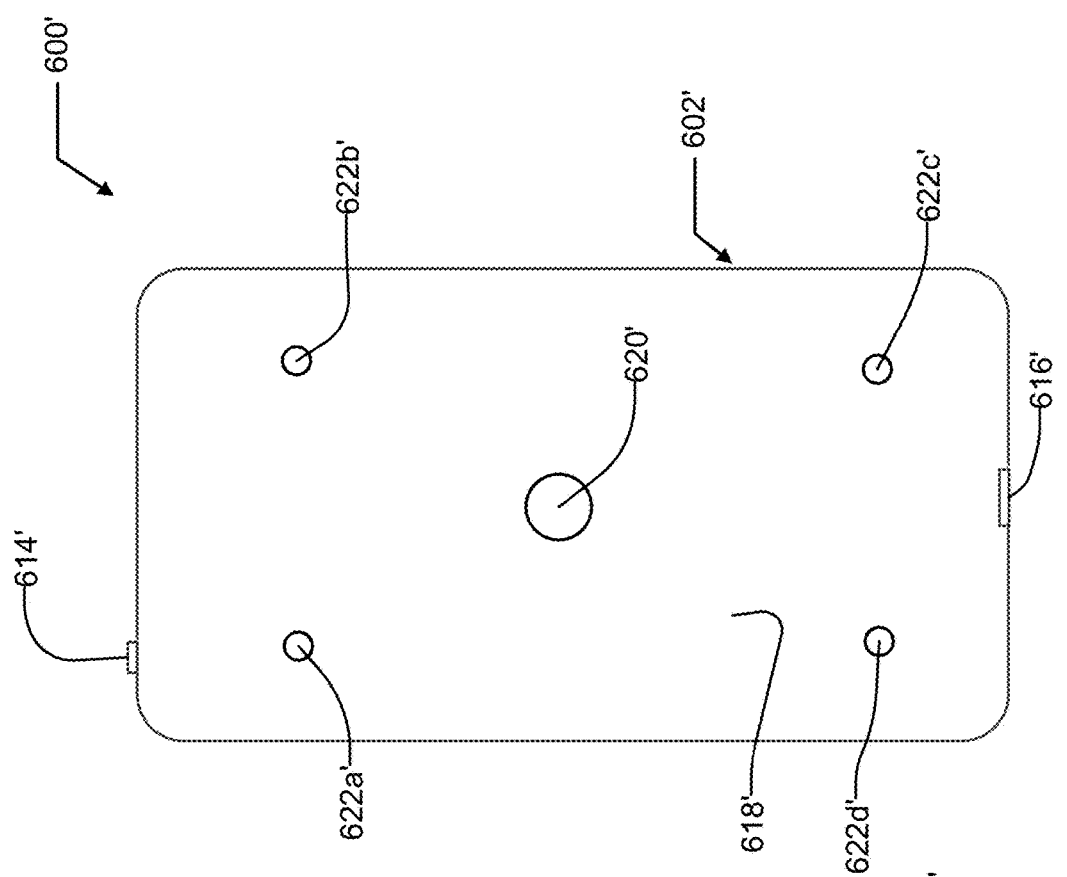
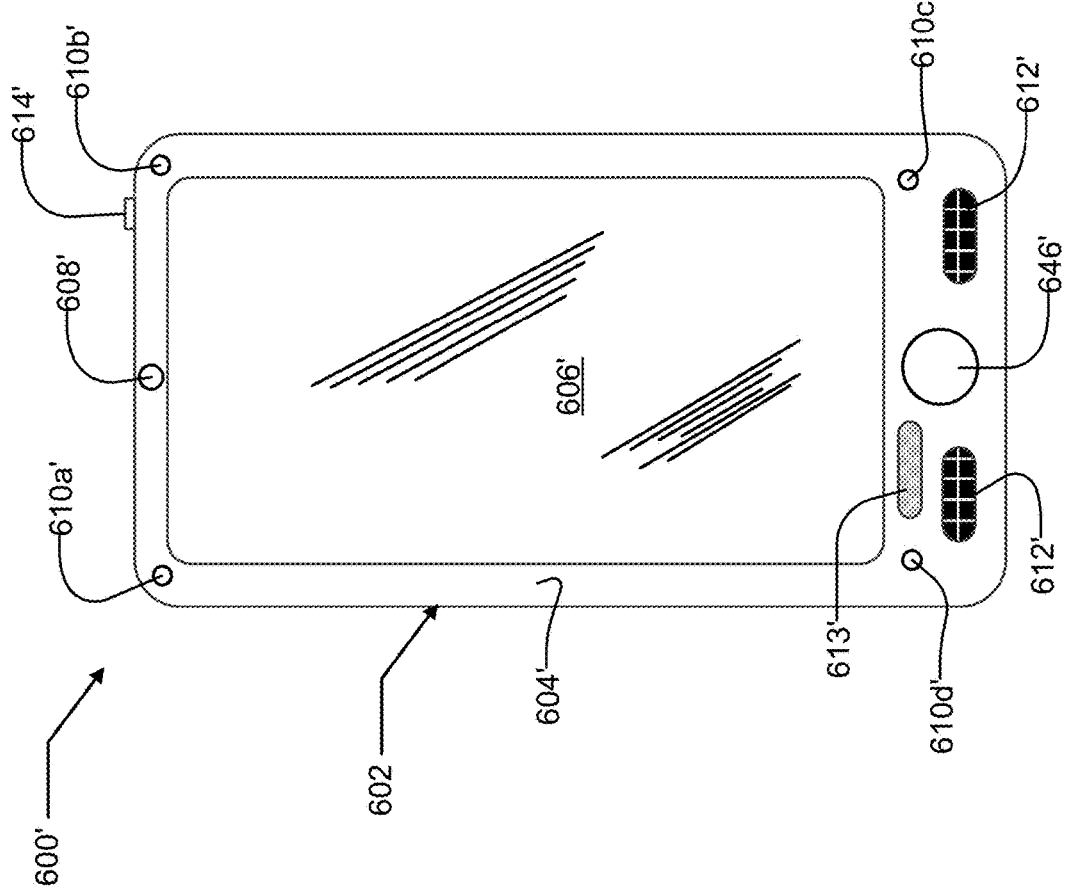

PERSONAL ELECTRONIC DEVICE FOR PERFORMING MULTIMODAL IMAGING FOR NON-CONTACT IDENTIFICATION OF MULTIPLE BIOMETRIC TRAITS

CROSS REFERENCE TO RELATED APPLICATIONS

The present disclosure is a continuation in part of U.S. patent application Ser. No. 14/299,867, filed Jun. 9, 2014, and presently pending, the entire disclosure of which is hereby incorporated by reference into the present disclosure.

FIELD

The present disclosure relates to systems and methods for obtaining images of biometric traits, and more particularly to hand-holdable and readily transportable personal electronic devices for performing non-contact, simultaneous acquisition and registration of images of multiple biometric human physiological traits such as fingerprints, finger-veins, palm prints, palm-veins, overall hand geometry, retina patterns and iris patterns, for the purpose of identifying an individual or confirming an identity of an individual.

BACKGROUND

The statements in this section merely provide background information related to the present disclosure and may not constitute prior art.

Biometric identification represent an objective measurement of one or more distinguishing biological traits (biometric characteristic) of an individual which can be stored in a database to enable comparison with other entries in the database for unique identification and verification of an individual. The most traditional form of biometric verification is fingerprinting. However, other biometric traits such as facial or other bodily characteristics (hand geometry, earlobe geometry, finger-vein, palm-vein, retina and iris patterns) have been used for biometric identification/verification purposes. Still further biometric traits that have been used are the spectral characteristics of a human voice, odor, and dental records. Even DNA and other physiological features/characteristics have been used to date in connection with biometric verification systems.

The digitizing of the information using computers has revolutionized the use of biometric technologies. Such digitizing of information has enabled automated operation of biometric verification systems, and is expected to become a major factor in the future, in part because of the ability to be easily integrated in various common tasks. A digitized biometric characteristic can be acquired rapidly, transmitted and stored in one or more databases, and then compared against information in various other one or more databases.

Independent of the biometric methodology used, the identification verification process initially requires a record of a person's unique characteristic is captured and stored in a database. When identification verification is required, a new record is captured and compared with the previous record in the database.

A biometric system can be either an "identification" system (e.g., to determine a person's identity) or a "verification" system (e.g., to verify a person's identity). The verification process requires capturing of raw biometric by a sensing device. This raw biometric is subsequently processed to extract the distinguishing biometric information, for example a fingerprint, from the raw biometric sample (i.e., image), and to convert it into a processed biometric identifier record. The record may typically be referred to as "biometric sample" or biometric "template." This is typically an encrypted mathematical representation of the original information or a representation of a subset of the characteristics after application of selective criteria. The biometric template may then be registered in a suitable storage medium for future use in making a comparison during an authentication request. For commercial applications, the original biometric information cannot be reconstructed from the stored/registered biometric template.

The biometric information preferably should satisfy a number of characteristics: 1) all individuals (with possibly limited exemptions) can present it; 2) the biometric information should be stable, and thus should not change with time and physiological condition; 3) it should be readily measurable, meaning acquisition of the information should be fast and straightforward; 4) the information should be distinctive or unique to each individual; 5) the information should be transformable, meaning that it should be capable of being reduced to a file that cannot be used for reconstruction of the original information; 6) the information should be digitally comparable to information from others; and 7) the information should be reliable, as well as difficult to imitate by an unauthorized individual and tamper resistant. Various other characteristics are also desirable for any system/method that hopes to obtain acceptance by the general public. Such characteristics/traits may extend to the satisfaction of privacy laws and generally accepted ethical codes and present day ethical norms.

The processing of the information of the recorded raw biometric trait to obtain the biometric template can be limited by the quality of the raw information obtained. For example, the fingerprint pattern (ridges and bifurcations of the finger) can be recorded using light, heat-emission or pressure analysis sensors. Common problems such as contamination, weathering and misuse of the sensor can modify locally the raw information, which will likely affect, at least somewhat, the quality of the identification process. When the biometric template is compared to the stored biometric templates, a matching numeric score is generated to confirm or deny the identity of the user. The threshold numeric score can be selected based on the desired level of accuracy for the system, as measured by the False Acceptance Rate and False Rejection Rate. It is apparent that one would want to minimize false rates. However, if the quality of the recorded raw biometric trait is not sufficient, the generated score will be lower which may lead to false readings.

It should be apparent that the accuracy of a biometric system is directly related to the instrumentation and method used to acquire the raw biometric trait. In addition, each characteristic trait used for identification can provide a varying degree of accuracy in conjunction with the possible method used for recording the raw biometric trait. To improve the overall decision accuracy, more than one biometric trait can be recorded and used for identification. Such systems are typically referred to as "multimodal biometric systems." An additional benefit of using multimodal systems is that such systems have an inherent resistance to being fooled by fraudulent data sources, such as imitation fingers, to obtain unauthorized access. There have been a number of disclosures of such systems. One specific example of an existing multimodal system incorporates the simultaneous utilization of a fingerprint and a finger-vein and/or palm-vein pattern. It is the understanding of the co-inventors of the present disclosure that all fingerprint, finger-vein and palm-vein identification system disclosed up to the present time require complete or partial contact of the finger or palm with the sensor of the biometric system. The need to have contact with the system presents, among other practical issues, potential health concerns (such as unintended or intended origination of infection) as well as contamination of the sensor as discussed previously. It would be clearly highly preferred by both users and system operators if the biometric identification process could be performed by non-contact means. The innovations of the present disclosure are focused, in part, around meeting this challenge with new systems and methods that do not require physical contact of a body part of an individual with the sensor element of a biometric system, and which also provide higher accuracy and resistance to spoofing.

Still further, previously developed systems for identifying or verifying an individual through the analysis of biometric traits have typically involved equipment which is not necessarily easily moved about, handled and transported by individuals. The advent and rapidly growing popularity of personal computing devices such as battery powered computing tablets has enabled a substantial amount of computing power, along with one or more cameras and a display, to be incorporated within a physical device which is typically even smaller, lighter, and even more portable than most present day laptop computers. Accordingly, it would be highly advantageous if a system for acquisition and analysis of biometric traits of an individual could be constructed in a form factor similar to a computing tablet, or possibly within a form factor similar to that of a present day smartphone. Providing the capabilities of a biometric acquisition and detection system within a device having a form factor and weight similar to a computing tablet or smartphone, or incorporating the capabilities of biometric acquisition to complement the capabilities of conventional tablets and smartphones and having a touchscreen user interface, would enable an individual to easily carry such a device on his/her person for extended lengths of time with little inconvenience. Such portability and ease of use would also make the implementation and use of such a device ideal for field applications (e.g. at security checkpoints outside of a building), as well as to enable identity verification to be performed, quickly, easily, and virtually anywhere the need arises.

SUMMARY

In one aspect the present disclosure relates to a hand holdable, portable apparatus for imaging a portion of an anatomy of a person, without physical contact with the anatomy. The apparatus may comprise a housing and a touchscreen display mounted in the housing. A plurality of illumination modules may also be disposed on the housing. The illumination modules may be configured to provide illumination of a portion of an anatomy of a person at different wavelengths and having different polarizations. One of the illumination modules may be configured to provide a near infrared (NIR) illumination with a polarization different from the polarization of the camera. A camera equipped with a polarization element is also supported on the housing. The camera forms an imaging subsystem for capturing one or more acquired images produced by illumination from the illumination modules. A processing subsystem is housed in the housing and can be configured to mathematically use the one or more acquired images obtained by the camera, the acquired images being associated with at least two of the illumination modules, to generate at least one new image. The at least one new image provides enhanced contrast of features associated with at least one of a surface biometric trait of the portion of the anatomy of the person and/or a subsurface biometric trait of the portion of the anatomy, and may be displayed on the touchscreen display.

In another aspect the present disclosure relates to a hand holdable, portable apparatus for imaging a portion of an anatomy of a person, without physical contact with the anatomy. The apparatus may comprise a housing as well as first, second and third illumination modules. The first illumination module is disposed on the housing and configured to provide a first illumination at a first wavelength, and having a first polarization. The second illumination module is disposed on the housing and configured to provide a second illumination at a second wavelength, and having a second polarization. The third illumination module is disposed on the housing and configured to provide a near infrared (NIR) illumination, and having the second polarization. A camera is also included which forms an imaging subsystem for capturing a plurality of acquired images. The camera further includes a first polarization and an image sensor for capturing the acquired images, each one of the acquired images being specific to one of the illumination modules. A processing subsystem is included which is configured to mathematically use at least two different acquired images associated with at least two of the illumination modules to generate at least one new image. The at least one new image provides enhanced contrast of features associated with at least one of a surface biometric trait of the body part and a subsurface biometric trait of the body part.

In still another aspect the present disclosure relates to a method for forming a hand holdable, portable apparatus for imaging a portion of an anatomy of a person, without physical contact with the anatomy. The method may involve providing a housing having a form factor substantially similar to at least one of a computing tablet or a smartphone. The method may further involve disposing a touchscreen display in the housing, and arranging a plurality of illumination modules on the housing to provide illumination of a portion of an anatomy of a person at different wavelengths and having different polarizations. At least one of the illumination modules is further configured to provide a near infrared (NIR) illumination with a polarization different from at least one of the other illumination modules. The method further involves arranging a camera on the housing, the camera forming an imaging subsystem for capturing a plurality of acquired images of the portion of the anatomy of the person produced by illumination from the illumination modules. The method also involves arranging a processing subsystem which is able to mathematically use at least two different acquired images obtained by the camera, the acquired images being associated with at least two of the illumination modules, to generate at least one new image of the portion of the anatomy of the person. The at least one new image provides enhanced contrast of features associated with at least one of a surface biometric trait of the portion of the anatomy of the person and a subsurface biometric trait of the portion of the anatomy of the person. The method may also involve displaying the at least one new image on the touchscreen display.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. In the drawings:

FIG. 13 is high level plan front view of one embodiment of an apparatus in accordance with the present disclosure for performing acquisition and analysis of biometric traits, and where the apparatus forms a compact, lightweight, tablet-like apparatus;

FIG. 14 is a plan view of a rear side of the apparatus of FIG. 13;

FIG. 15 is a side view of the apparatus of FIG. 13;

FIG. 17 is a plan view of a front side of another embodiment of the apparatus of the present disclosure implemented in a smartphone; and FIG. 18 is a plan view of a rear panel portion of the smartphone of FIG. 17.

DETAILED DESCRIPTION

Figure 1:
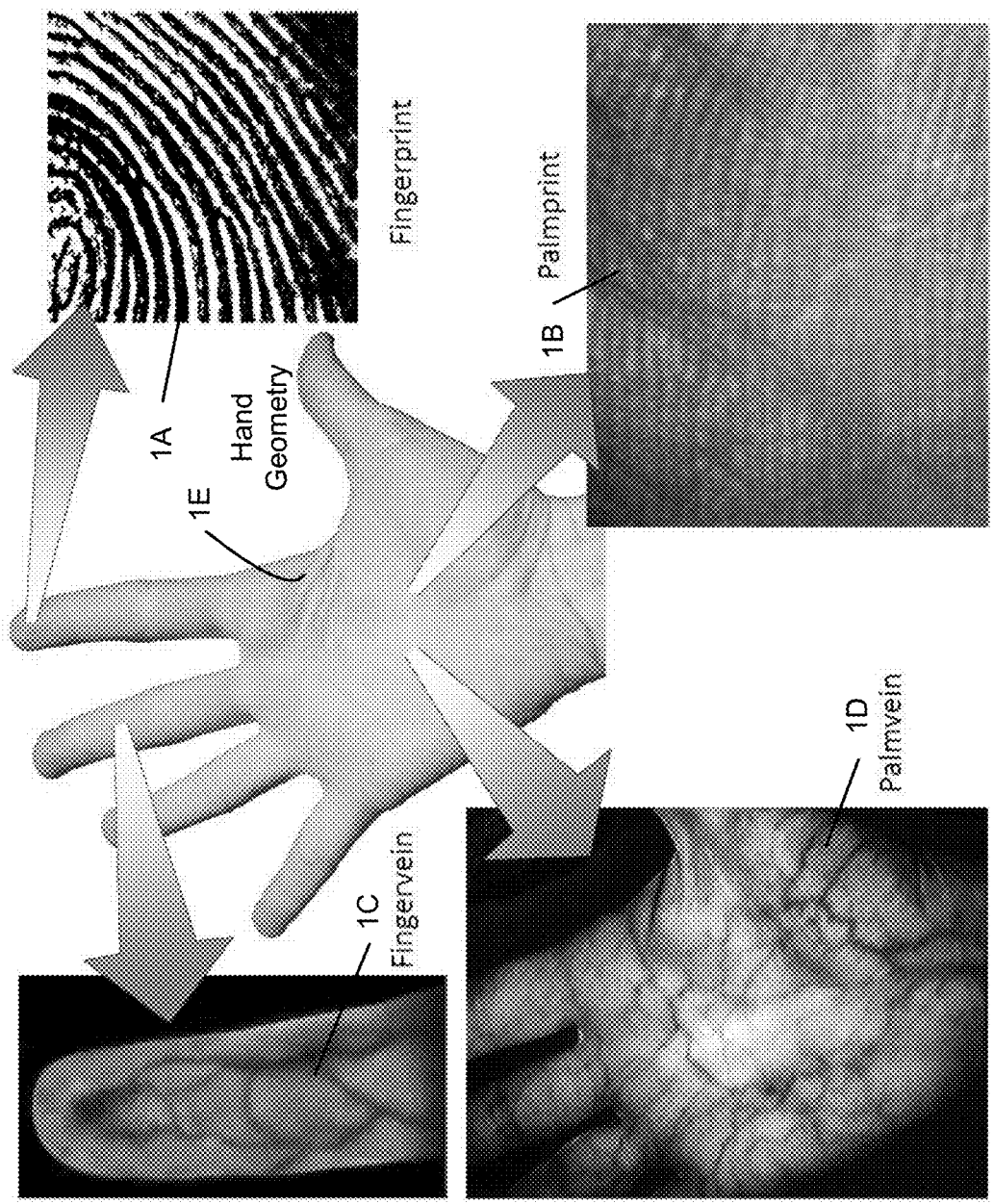
FIG. 1 is an illustration of a human hand showing enlargements of four biometric features or traits of the hand, those being the fingerprint, the palm print, the finger-vein the palm-vein, and palm or hand geometry, which may be used as biometric traits by the present disclosure in identifying an individual.

The following description is merely exemplary in nature and is not intended to limit the present disclosure, application, or uses. It should be understood that throughout the drawings, corresponding reference numerals indicate like or corresponding parts and features.

Overview of Pertinent Technology

The background technology that the present disclosure extends upon is described in U.S. Pat. No. 5,929,443 and related work that has been published in the scientific literature. Several basic principles discussed in U.S. Pat. No. 5,929,443 that are incorporated in the present disclosure can be summarized as follows. Initially, polarized light injected into tissue remains partially polarized after entering the tissue. This enables the use of polarization imaging techniques under near infrared illumination to enhance visualization of structures located below the skin layer (sub-dermal structures). The image under polarized illumination can be separated into the polarized and unpolarized components. The unpolarized image component is equally distributed between the two polarization image components, but the polarized component is present only in the parallel polarization image component. Isolating the polarized image component, such as via subtraction of the parallel from the perpendicular image components, results in the image of the surface structures of the tissue (such as the fingerprint) being enhanced. Using the unpolarized image component, the visibility of sub-dermal structures is enhanced. Inter-image operations between unpolarized images acquired at different wavelengths can enhance the visibility of objects located at different depth zones, thus providing depth profiling and/or enhancement of the visualization of the subsurface structures.

EXAMPLE EMBODIMENTS

The human hand contains features that have been known for decades (or longer) to provide unique identification information in humans. FIG. 1 displays characteristic examples for the case of the human palm. The human palm contains biometric information that has been widely used for identification including the fingerprint 1A, which is the most well known and utilized biometric characteristic, the palm print 1B, the finger-vein pattern 1C, the palm-vein pattern 1D, and the overall palm and/or hand geometry 1E. Various ones of these biometric traits have been used in various biometric systems presently on the market.

The present disclosure teaches systems and methods for non-contact, simultaneous acquisition and registration of multiple biometric signatures. Systems that make use of multiple biometric signatures are often referred to as "multimodal" biometric systems. In one specific implementation, the teachings of the present disclosure may be used to simultaneously analyze and acquire all five of the biometric traits 1A-1E illustrated in FIG. 1. This provides a number of significant benefits such as significantly improved accuracy. Another benefit is that if one biometric trait is missing in a person either permanently of temporarily (such as from injury), the other biometric traits associated with the individual can still be used. The systems and methods of the present disclosure can use existing databases that contain information from specific biometric traits (such as the fingerprint or palm-vein), thus enabling integration with existing databases that can be subsequently enhanced via registration of the additional biometric traits. The present disclosure also provides a distinctive and highly desirable non-contact solution: the human hand is remotely examined without any physical contact of the hand or its digits with any sensor component of the system or its peripherals.

Figure 2:
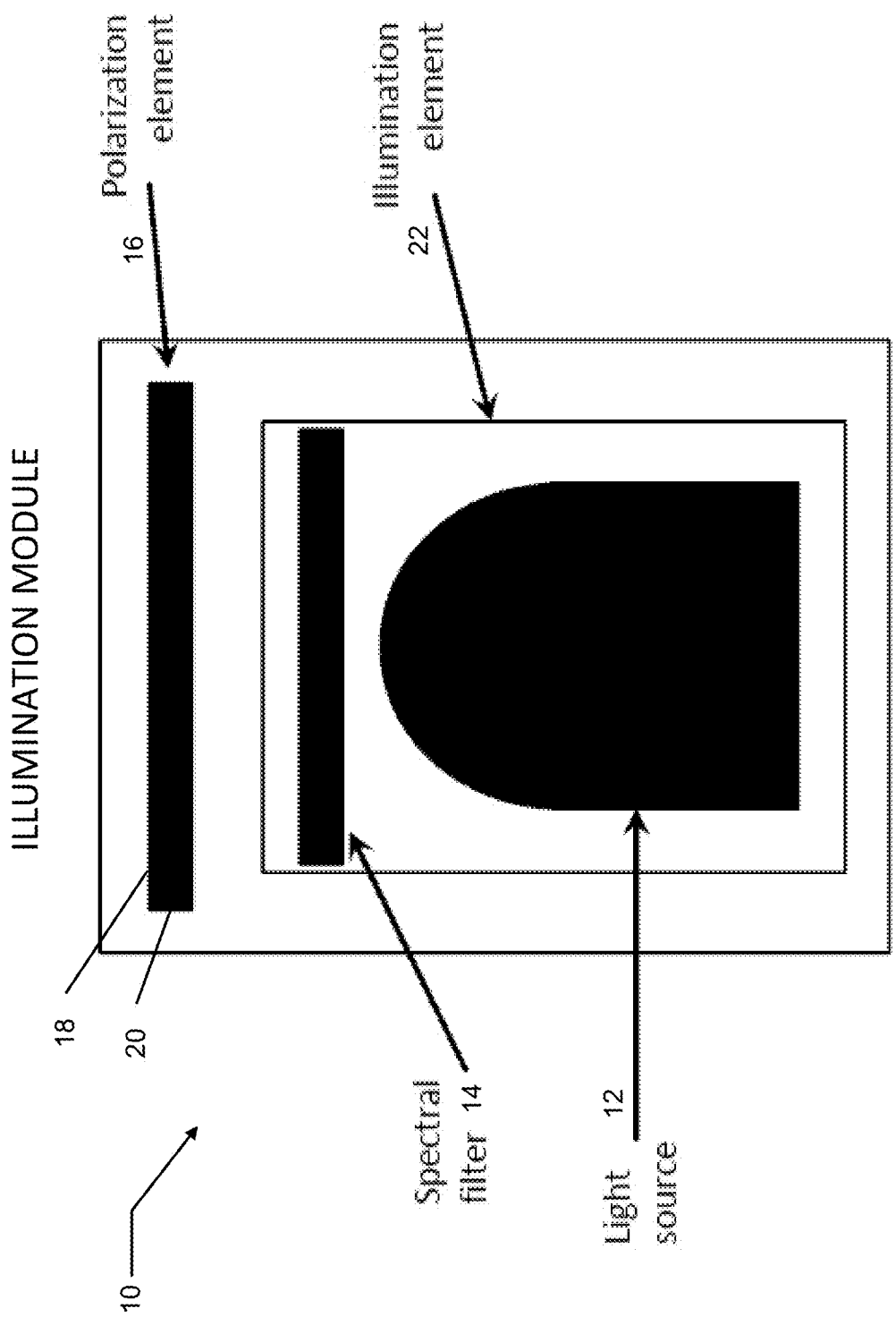
FIG. 2 is a high level diagram of one example of an illumination module which may be used with an imaging system of the present disclosure.

The systems and methods of the present disclosure can be implemented in a plurality of cost efficient designs. One specific embodiment of an imaging system of the present disclosure that performs the acquisition of the various biometric characteristics contains illumination modules that provide relatively narrowband-polarized illumination. The schematic shown in FIG. 2 describes in general terms one such illumination module 10. The illumination module 10 contains a light source 12, such as an LED, OLED or other compact light emitting or delivering device. In addition, a spectral filter 14 may be used to provide purification or modulation of the spectral content of the light source delivered to the target.

The illumination module 10 also includes a polarizing element 16 to select the polarization state of the illumination to be one of the principal polarization states. Such principal polarization state may include the orthogonal polarization states in linearly polarized light, in circularly polarized light or in elliptically polarized light. The polarizing element 16 may contain a linear polarizer 18 and a combination of waveplates 20, both indicated in FIG. 2 in simplified diagrammatic form. Each illumination module 10 may be integrated with a single device, such as a flat panel display, which provides the specific characteristics of each module, namely, a specific principal polarization state for each relatively narrowband illumination spectral band (wavelength).

Figure 3:
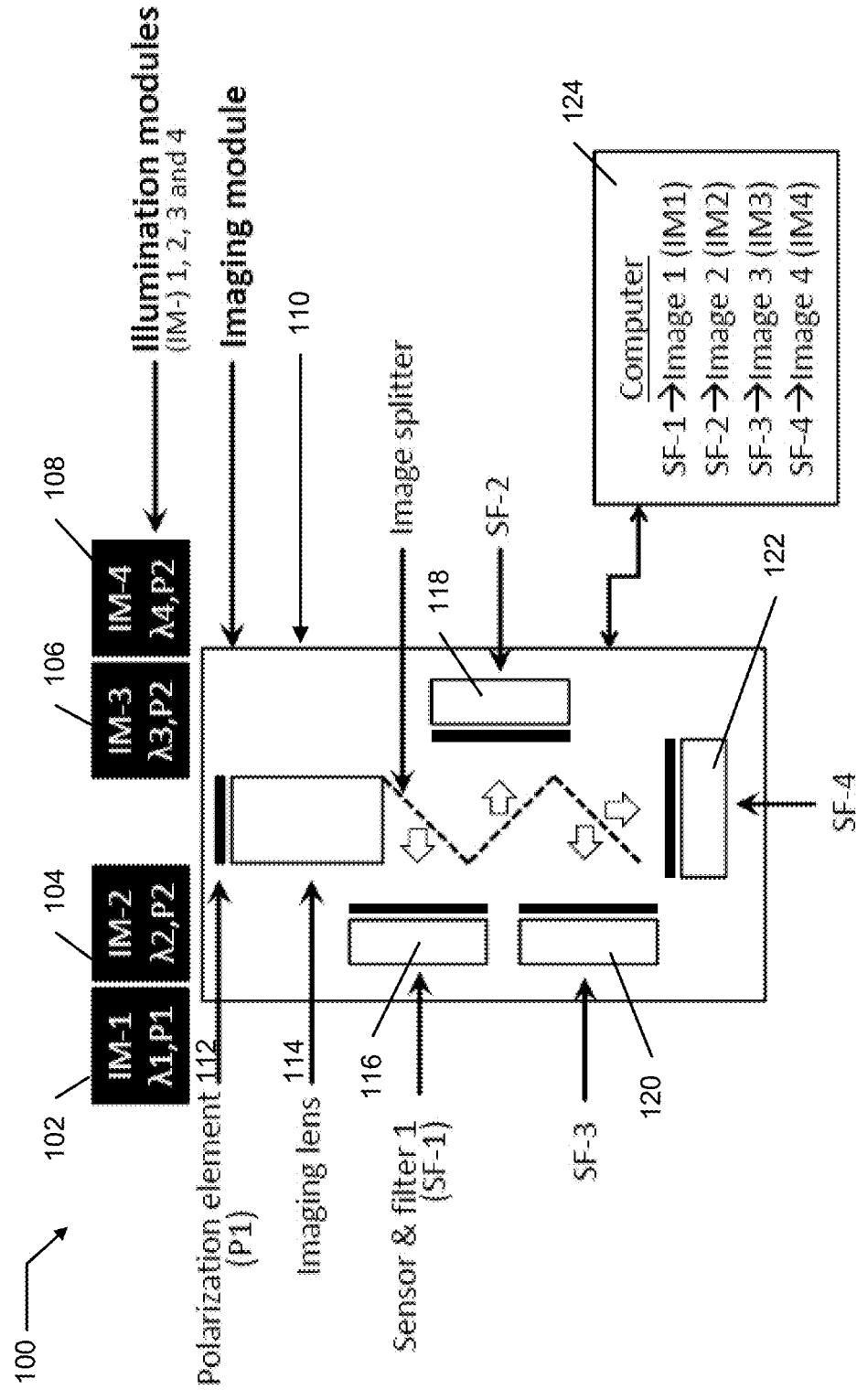
FIG. 3 is a schematic depiction of one example of a multimodal imaging system of the present disclosure for non-contact acquisition of biometric signatures.

FIG. 3 shows a schematic depiction of one example of a multimodal imaging system 100 of the present disclosure for non-contact acquisition of biometric signatures. In this example the system 100 has four illumination sources formed by illumination modules 102(IM-1), 104 (IM-2), 106 (IM-3) and 108 (IM-4), that provide illumination at wavelengths λ1, λ2, λ3 and λ4 (or otherwise relatively narrow spectral bands), respectively. Each illumination module 102-108 may be constructed generally in accordance with illumination module 10 of FIG. 2, and has a specific principal polarization state (P1 or P2). Each imaging module 110 also includes a polarization element 112 that selects a principal polarization state (P1) of the light entering into the system 100 for image acquisition. It should be noted that only the polarization state in illumination module 102 is the same as that of the imaging module 110, that being because of the use of polarization element 112 which provides polarization state P1, while the other illumination modules have orthogonal polarization to that of the imaging module 110. A single imaging lens system 114 may be used for the relay of the image of the target area (hand) exposed to the polarized light of the illumination modules 102-108 into a plurality of imaging sensor/filter subsystems 116-122. The light collected by the imaging lens system 114 is separated and each wavelength is directed to different ones of the sensor/filter subsystems 116-122. The sensor/filter subsystems 116-122 each are two dimensional sensors equipped with a spectral filter. Each of the sensor/filter subsystems 116-122 are used to subsequently acquire the image component associated with each illumination wavelength λ1, λ2, λ3 and λ4, associated with illumination modules 102-108 (IM-1 through IM-4, respectively) with a polarization state that is parallel or perpendicular (referring to the principal polarization orientations as defined above) to the polarization of the imaging module depending on the polarization elements 112. Specifically, the image information obtained from the illumination provided by illumination module 102 (IM-1) is the parallel polarization image of IM-1, while the image information obtained from the illumination modules 104-106 (IM-2, IM-3 and IM-4) represents the perpendicular polarization images of the illuminations provided by illumination modules 104-108 (IM-2, IM-3 and IM-4, respectively). The system 100 may use a processing subsystem, in one example a computer 124, to mathematically process the acquired images to produce one or more new images that present the selected biometric traits with a visually enhanced presentation.

Figure 4:
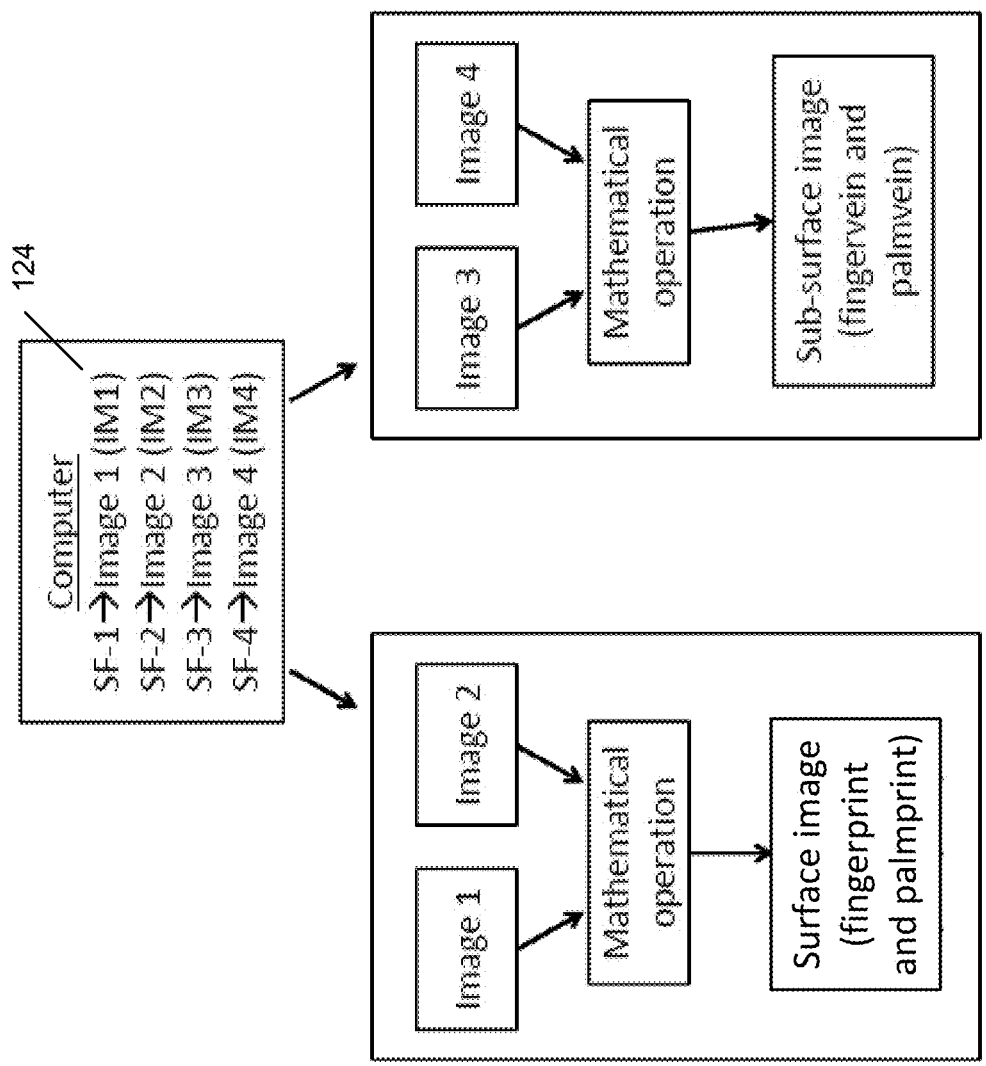
FIG. 4 is a diagrammatic illustration of operations that may be performed by the system using the computer shown in FIG. 3.

FIG. 4 describes the inter-image operations that may be utilized by the computer 124 to extract the surface information images (such as the finger print and palm print) or the subsurface information images (such as the finger-vein and palm-vein). Typically, the following parameters or methods apply but numerous variations can be used. Initially, the polarization of the illumination modules 102-108 is preferably either linear polarization or circular polarization, but of the same type for all modules 102-108 (IM-1 through IM-4). The wavelengths of illumination module 102 (IM-1) and illumination module 104 (IM-2) are the same (λ1=λ2). This wavelength is preferably in the violet, blue or green spectral range. The wavelengths of illumination modules 106 and 108 (IM-3 and IM-4) (λ3 and λ4) are preferably in the red and/or near infrared spectral range including wavelengths in the 600 to 1750 nm spectral range. The mathematical operation between images corresponding to illumination from module 102 (IM-1) and illumination from module 104 (IM-2) to obtain the finger print and/or palm print image is a subtraction after normalizing (weighting) one image with respect to the other using a predetermined normalization/weighting method. The mathematical operation between images corresponding to illumination from modules 106 and 108 (IM-3 and IM-4) to obtain the finger-vein image and/or the palm-vein image is a subtraction or division after normalizing (weighting) one image with respect to the other using a predetermined normalization/weighting method. The illumination module 108 (IM-4) may be omitted (along with SF-4 and IM-4) and utilize the image produced from module 106 (IM-3) illumination to obtain the finger-vein and/or palm-vein image. All images obtained after inter-image operations described in FIG. 4 can be further digitally enhanced and processed either by the computer 124 or by a different component to obtain the biometric patterns of interest. The image resolution needs to be adequate to resolve the biometric characteristic of interest. For example, an image that contains the entire hand should be at least preferably about 8 megapixels or larger to meet the image resolution requirements for capturing the fingerprint pattern. Sections of the image (such as the palm-vein) can thereafter be digitally reduced in size for faster processing. The lens system is adjusted to present an in-focus image of the hand. The focal range may be large enough to properly image the hand without out-of focus areas. An auto-focus lens may also be used.

Figure 5:
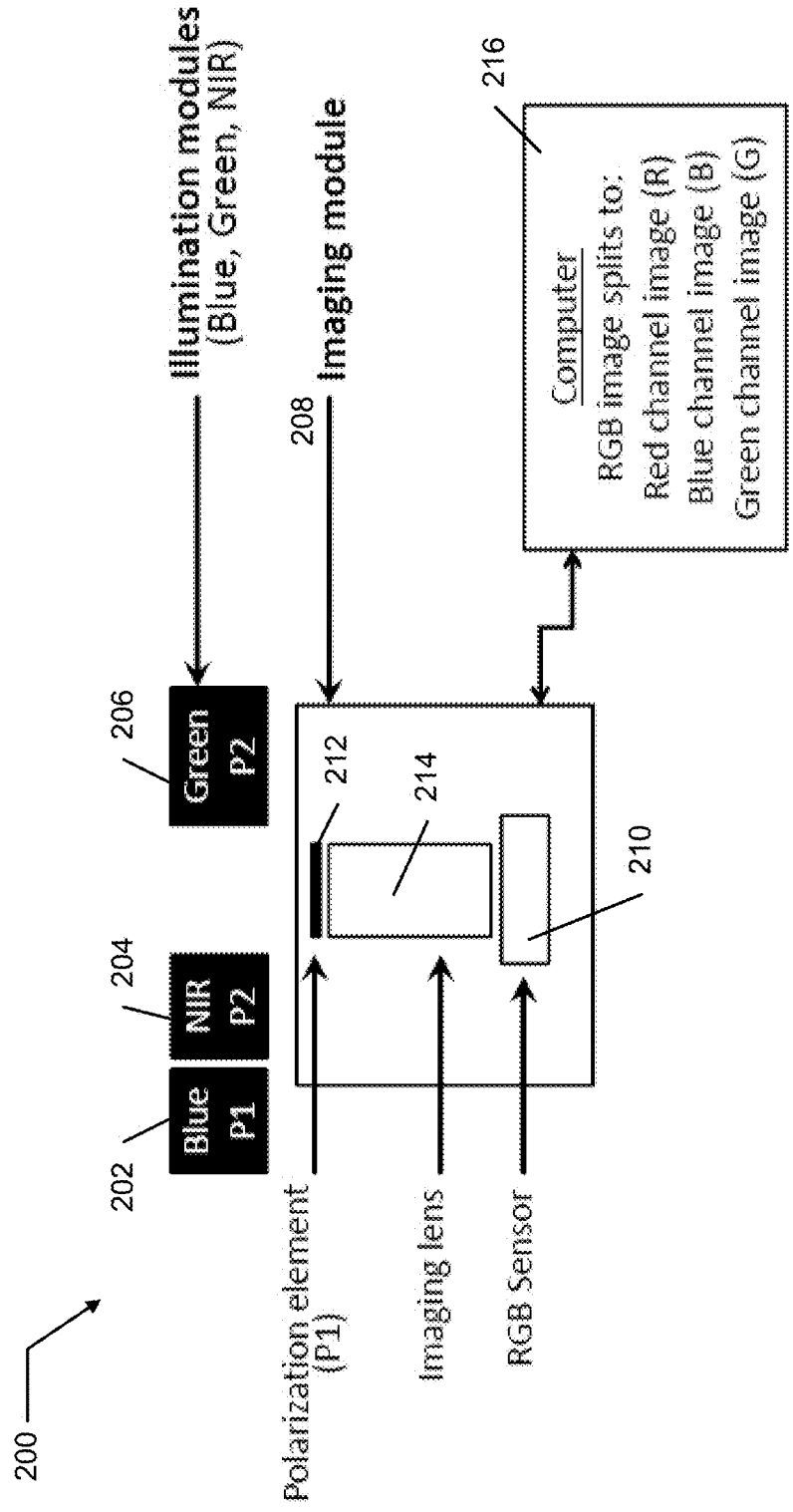
FIG. 5 is a high level diagram of another embodiment of the present disclosure that makes use of three illumination sources, with one of the sources being a NIR illumination source.

FIG. 5 shows one example of a multimodal imaging system 200 for non-contact acquisition of biometric signatures using an imaging subsystem formed by an imaging module 208. The imaging module 208 makes use of a color sensing subsystem, which in this example is a single color RGB sensor 210. In this example illumination modules 202, 204 and 206 provide optical illumination signals in the blue (module 202) spectrum, the NIR spectrum (module 204) and the green spectrum (module 208). Illumination module 202 has polarization P1, while modules 204 and 206 have polarization P2 which is orthogonal to P1. The imaging module 208 includes a polarization element P1 212 (i.e., parallel polarization to illumination module 202) and an imaging lens 214. Such a RGB sensor 210 is designed to separate and record in different sets of pixels the different spectral components of the visible light such as the red, blue and green (RGB) components used for color image recording (video recording or in color photography) in the electronics industry. The RGB sensor 210 effectively obtains a plurality of acquired images which can be analyzed by a processing subsystem, which in this example is a computer 216.

In addition, this sensor RGB sensor 210 should be able to record the near infrared (NIR) image as currently available color sensors (such as CCD and CMOS color image sensors) are also sensitive and capable of recording light in the NIR spectra region. Specifically, the blue color and green color recording pixels of the RGB sensor 210 are also sensitive (capable of recording) photons in about the 800-900 nm spectral region. The red color recording pixels of the RGB sensor 210 are also sensitive in the entire NIR range up to about 900 nm. For this reason, RGB sensors are often equipped with a NIR blocking filter when used in conventional color video or photography applications to allow only the visible light to reach the detector. However, by removing this filter, a conventional RGB color image sensor can also detect the NIR light. The present disclosure takes advantage of this feature to enable acquisition of both visible wavelength and NIR wavelength images using the single RGB sensor 210.

As noted above, the system 200 shown in FIG. 5 incorporates the three illumination sources provided by illumination modules form 202-206. Illumination module 202 operates in the blue region, which is associated with an image that is recorded in the blue color recording pixels of the RGB sensor 210. Illumination module 206 operates in the green region and is associated with an image that is recorded in the green color recording pixels of the RGB sensor 210. Illumination module 204 operates in the NIR region (between about 650 and 900 nm) and is associated with an image that is recorded by all pixels (blue green and red) or only (or mostly) by the red color recording pixels of the RGB sensor 210. Specifically, if the NIR illumination is in approximately the 800-900 nm spectral range, all pixels (blue green and red) of the RGB sensor 210 will record the NIR image with about similar intensity. However, if the NIR illumination is in approximately the 600-800 nm spectral range, the red color recording pixels will record the NIR image as the sensitivity of the blue and green pixels is very small in this range. The single lens 214 is used for the relay of the image of the target area (e.g., hand) exposed to the polarized light from the illumination modules 202-206 and subsequently recorded by the single RGB sensor 210. (There are various types of sensors involving various designs, such as the Bayer filter sensor, the 3CCD sensor and the Foveon x3 sensor).

With further reference to FIG. 5, the polarizing element 212 (P1) is also positioned in front of the imaging lens 214 so that a specific polarization state (referring to the principal polarization orientations as defined above) is recorded by the RGB sensor 210. In addition, the polarization element 212 provides parallel polarization with respect to the polarization of the blue illumination module 202 (P1), and orthogonal polarization with respect to the NIR illumination module 204 and the green illumination module 206.

Figure 6:
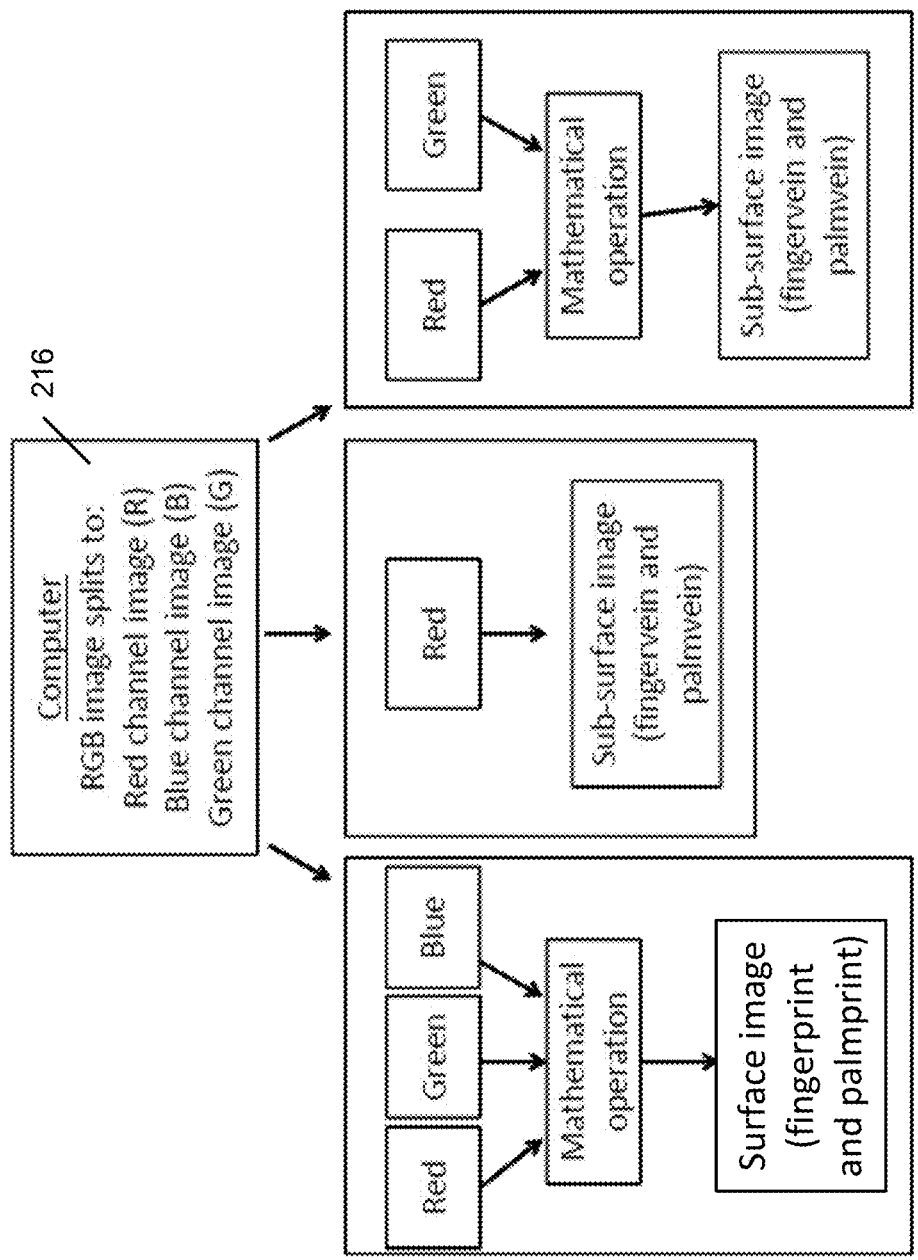
FIG. 6 is a high level diagram of operations performed by the computer of FIG. 5 in obtaining a selected one or more of a finger print, a palm print, a finger-vein and a palm-vein.

FIG. 6 describes the inter-image operations performed by the computer 216 to extract the surface information images (such as the finger print and palm print) or the subsurface information images (such as the finger-vein and palm-vein). This general description provided in FIG. 6 can be further expanded as following. All three pixels sets of the RGB sensor 210, (red, blue and green) capture an orthogonal polarization image of the NIR illumination originating from NIR illumination module 204 (expressed here as NIR[blue], NIR[green] and NIR[red]) and the relative intensity of each image can be measured and is considered as known. Thus:

$NIR[blue] = k1 \times NIR[red]$ and $NIR[green] = k2 \times NIR[red]$ where k1 and k2 are known (measurable) constants.

The red image (R) contains only the orthogonal polarization image of the NIR illumination recorded in the red pixel set, thus:

$R = NIR[red]$.

The green image (G) contains the orthogonal polarization image component produced from the green illumination module 206 (Gorthogonal) and the orthogonal polarization image of the NIR illumination NIR[green] from NIR illumination module 204, thus:

$G = Gorthogonal + k2 \times NIR[red] = Gorthogonal + k1 \times R$

The blue image (B) contains the parallel polarization image component of the blue illumination (Bparallel) and the orthogonal polarization image of the NIR illumination NIR[blue], thus:

$B = Bparallel + k1 \times NIR[red] = Bparallel + k1 \times R$

Therefore:

$Gorthogonal + G - k1 \times R$ $Bparallel = B - k1 \times R$

The red (R), green (G) and blue (B) image components are readily available from the RGB sensor 210, while the parameters k1 and k2 can be determined via simple testing. The testing can be accomplished, for example, by recording the image of an object when only the NIR illumination module 204 is turned on. The orthogonal polarization component of the green and the parallel polarization component of the blue can be extracted via the mathematical image processing described above.

Typically, the following parameters or methods apply but numerous variations can be used. Initially, the polarization of the illumination modules is either linear polarization or circular polarization, but of the same type for all modules. The mathematical operation between the orthogonal polarization component of the green and the parallel polarization component of the blue used to obtain the finger print and/or palm print image is a subtraction or division operation that may be performed by the computer 216. The subtraction or division may be performed after normalizing (weighting) one image with respect to the other using an initial normalization/weighting method. The orthogonal polarization image of the NIR illumination is used to obtain the finger-vein and/or palm-vein image. Alternatively, a mathematical operation between the orthogonal polarization component of the green and the orthogonal polarization image of the NIR illumination may be used by the computer 216 to obtain the finger-vein and/or palm-vein image.

All images obtained after inter-image operations described in FIG. 6 can be further digitally enhanced and/or processed by the computer 216, or an additional enhancement component, to obtain an image of the biometric trait of interest. The image resolution should be adequate to resolve the biometric trait of interest. For example, an image that contains the entire hand should be at least approximately 8 megapixels or larger to meet the image resolution requirements for capturing the finger print pattern. Sections of the image (such as the palm-vein) can be digitally reduced in size for faster processing. The imaging lens system 214 may be adjusted to present an in-focus image of the hand. The focal range may be large enough to properly image the hand without out-of focus areas. An auto-focus lens may also be used.

Figure 7:
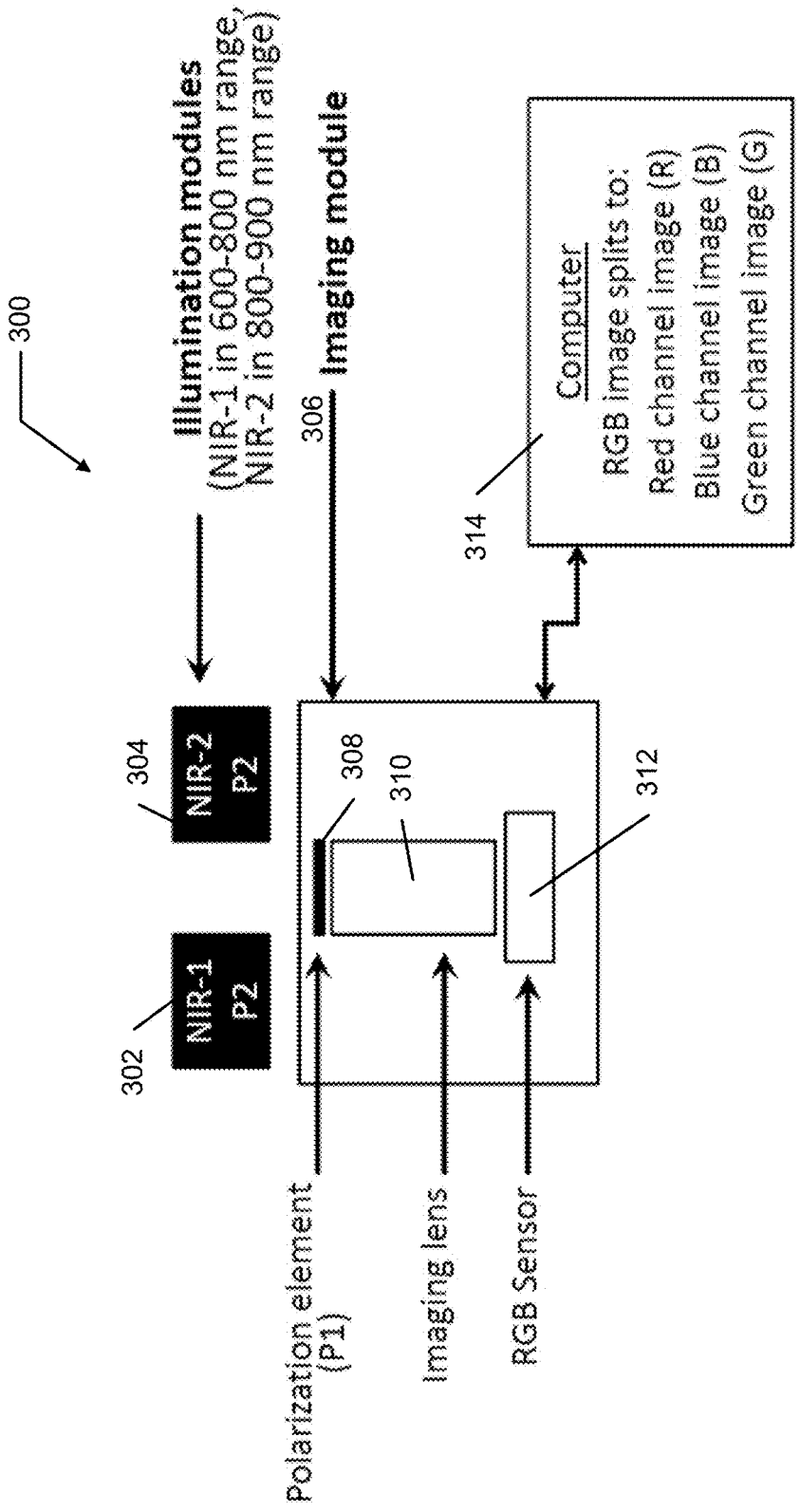
FIG. 7 is a high level diagram of a subsystem that may be used in connection with a system such as shown in FIG. 5, which uses just NIR illumination sources, for example to obtain subsurface biometric traits.

Still another embodiment of the present disclosure is shown in connection with the system 300 in FIG. 7. It will be appreciated immediately that the system 300 of FIG. 7 is preferably intended to be used in connection with, for example, the embodiment of FIG. 5. This can be understood by considering that the use of a single RGB sensor is a way to incorporate the functionality of the system 100 in FIG. 3 using a single color (RGB) sensor. As the color sensor offers the possibility to record three separate images (associated with the blue, green and red color designated pixels) while system 100 in its complete implementation requires acquisition of 4 images, the system 200 of FIG. 5 is designed to emphasize an improved detection of the surface image (by using the blue and green images to obtain the surface image) and use only one image (the NIR image) to record the sub-surface image. The system 300 in FIG. 7 incorporates the use of two NIR wavelengths to obtain an improved detection of the subsurface image. The two systems can be used in combination (using four illumination modules, blue, green, NIR-1 and NIR-2) and the image acquisition process may involve two steps. In the first step, the three illumination sources (blue, green, NIR-1 or NIR-2) of the system 200 of FIG. 5 are turned on and an image is acquired. In the second step, the illumination sources (NIR-1 and NIR-2) of the system 300 of FIG. 7 are turned on and a second RGB image is acquired. The time separation between the two image acquisitions can be very small, for example on the order of 100 milliseconds or less. With this sequential image registration using the embodiments of system 200 and 300, the full functionality and capabilities of the system 100 are recovered.

The system 300 in this example makes use of two illumination sources formed by illumination modules 302 (NIR-1) and 304 (NIR-2), one (module 302) operating in about the 600-800 nm spectra region and the other (module 304) operating in the 800-900 nm spectra region. An imaging subsystem in the form of imaging module 306 is provided which makes use of a polarization element 308, an imaging lens 310 and a RGB sensor 312. The imaging module 306 provides an output to a processing subsystem formed in this example by computer 314. The image from the NIR illumination in the approximately 800-900 nm spectral range is recorded by all pixels (blue, green and red) of the RGB sensor 312 with similar intensities (for reasons discussed earlier). The image from the illumination in the approximately 600-800 nm spectral range (i.e., from NIR illumination module 304) is recorded predominantly by the red pixels of the RGB sensor 312 because the sensitivity of the blue and green pixels is very small in this spectral range.

The single imaging lens 310 may be used for the relay of the image of the target area (e.g., hand) exposed to the polarized light of the illumination modules 302 and 304, and subsequently recorded by the single RGB sensor 312. It will be appreciated that there are various other types of sensors that could be employed in place of an RGB sensor. The polarizing element 308 (P1) is also positioned in front of the imaging lens 310. In addition, the polarization elements of both illumination sources 302 and 304 provide orthogonal polarization (P2) with respect to the polarization of the imaging system 306, which uses polarization P1.

Figure 8:
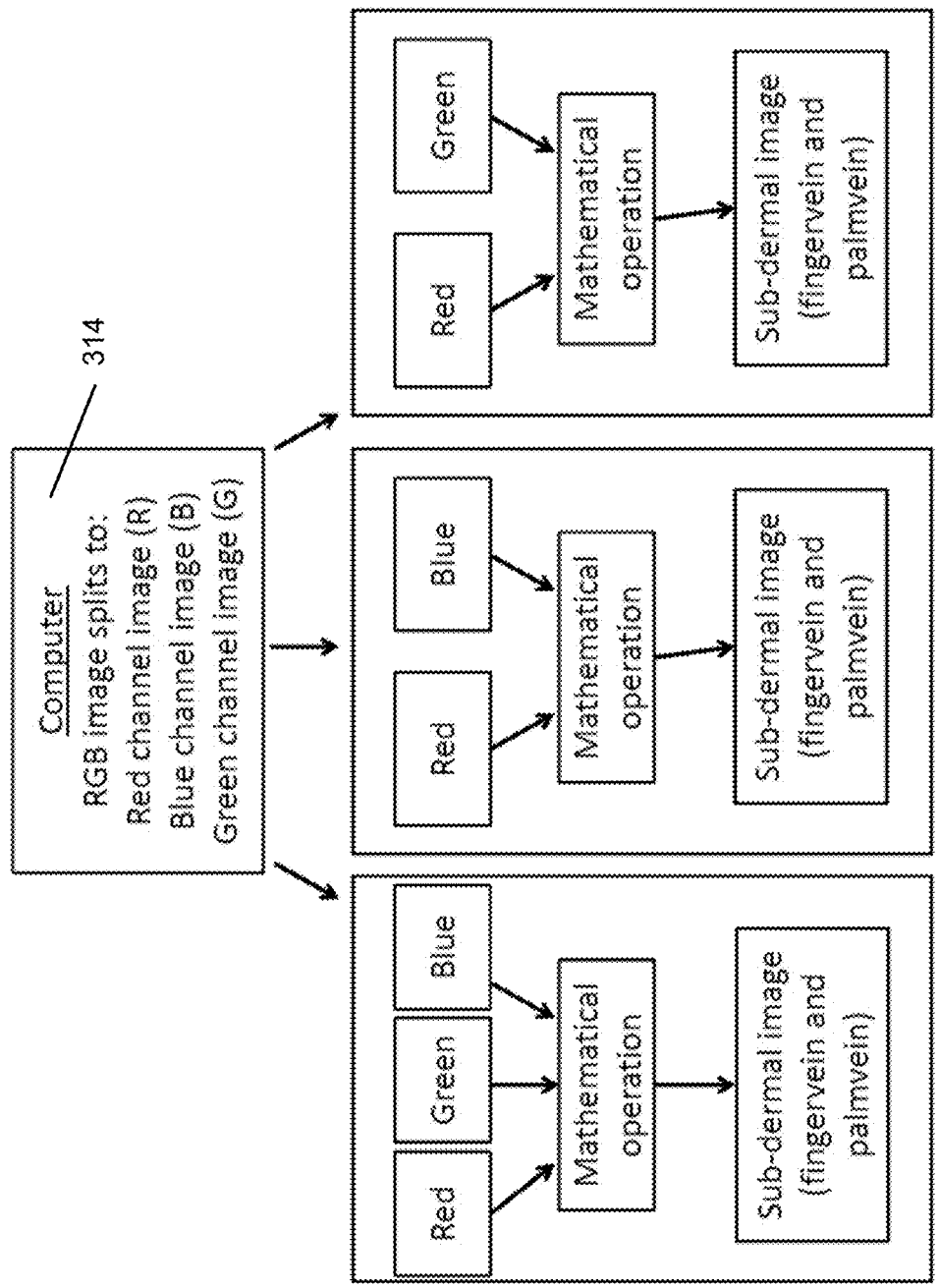
FIG. 8 is a diagram showing operations that may be performed by the computer of the subsystem shown in FIG. 7.

FIG. 8 describes the inter-image operations performed by the computer 314 to extract the subdermal information images (such as the finger-vein and palm-vein). This general description provided in FIG. 8 can be further expanded as follows.

All three pixels sets, (red blue and green) of the RGB sensor 312 capture an orthogonal polarization image of the illumination (expressed here as NIR-2[blue], NIR-2[green] and NIR-1 and NIR-2[red]), and the relative intensity of each image can be measured and is considered as known. Thus:

$$NIR\text{-}2[blue] = c1 \times NIR\text{-}2[red] \text{ and}$$

$$NIR\text{-}2[green] = c2 \times NIR\text{-}2[red]$$

where c1 and c2 are known (measurable) constants.

The green image (G) and blue (B) contains only the orthogonal polarization image of the NIR-2 illumination recorded in the red pixel set of the RGB sensor 312. Thus:

$$B = NIR\text{-}2[blue] \text{ and}$$

$$G = NIR\text{-}2[green].$$

Thus, the B and G images contain identical information, assuming that the green and blue pixels do not record any photons of the NIR-1 illumination. If there is a leakage, and if some of the NIR-1 illumination module signal can be detected, simple calibration and image processing similar to that described herein can be used to extract the pure NIR-2 image.

The red image (R) contains the orthogonal polarization image component of both illumination wavelengths NIR-1 and NIR-2. Thus:

$$R = NIR\text{-}1[red] + NIR\text{-}2[red] = NIR\text{-}1[red] + B/c1 = NIR\text{-}1[red] + G/c2$$

Therefore:

$$NIR\text{-}1 = R - G/c2 \text{ and/or } NIR\text{-}1 = R - B/c1$$

The R, G and B image components are readily available from the RGB sensor 312, while the parameters c1 and c2 can be determined via simple testing. Testing can be accomplished by recording the image of an object when only the NIR-2 illumination module is turned on. The NIR-1 and NIR-2 image components (i.e., acquired images) can be obtained via inter-image mathematical processing.

Typically, the following parameters or methods apply but numerous variations can be used. The orthogonal polarization acquired images of the NIR-1 and NIR-2 illuminations are used to obtain the finger-vein and/or palm-vein image via a mathematical operation that may include subtraction or division between the acquired images. The subtraction or division may be performed after normalizing (weighting) one image with respect to the other using an initial normalization/weighting method.

All images obtained after inter-image operations described in FIG. 8 can be further digitally enhanced and processed to obtain the image of the biometric trait of interest. The image resolution should be adequate to resolve the biometric trait of interest. The imaging lens 310 may be adjusted to present an in-focus image of the hand. The focal range may be large enough to properly image the hand without out-of focus areas. An auto-focus lens may also be used. The method depicted by FIGS. 7 and 8 can only visualize the sub-dermal veins, although it may be used in conjunction with the method depicted by FIGS. 5 and 6 by using 4 illumination sources.

Figure 9:
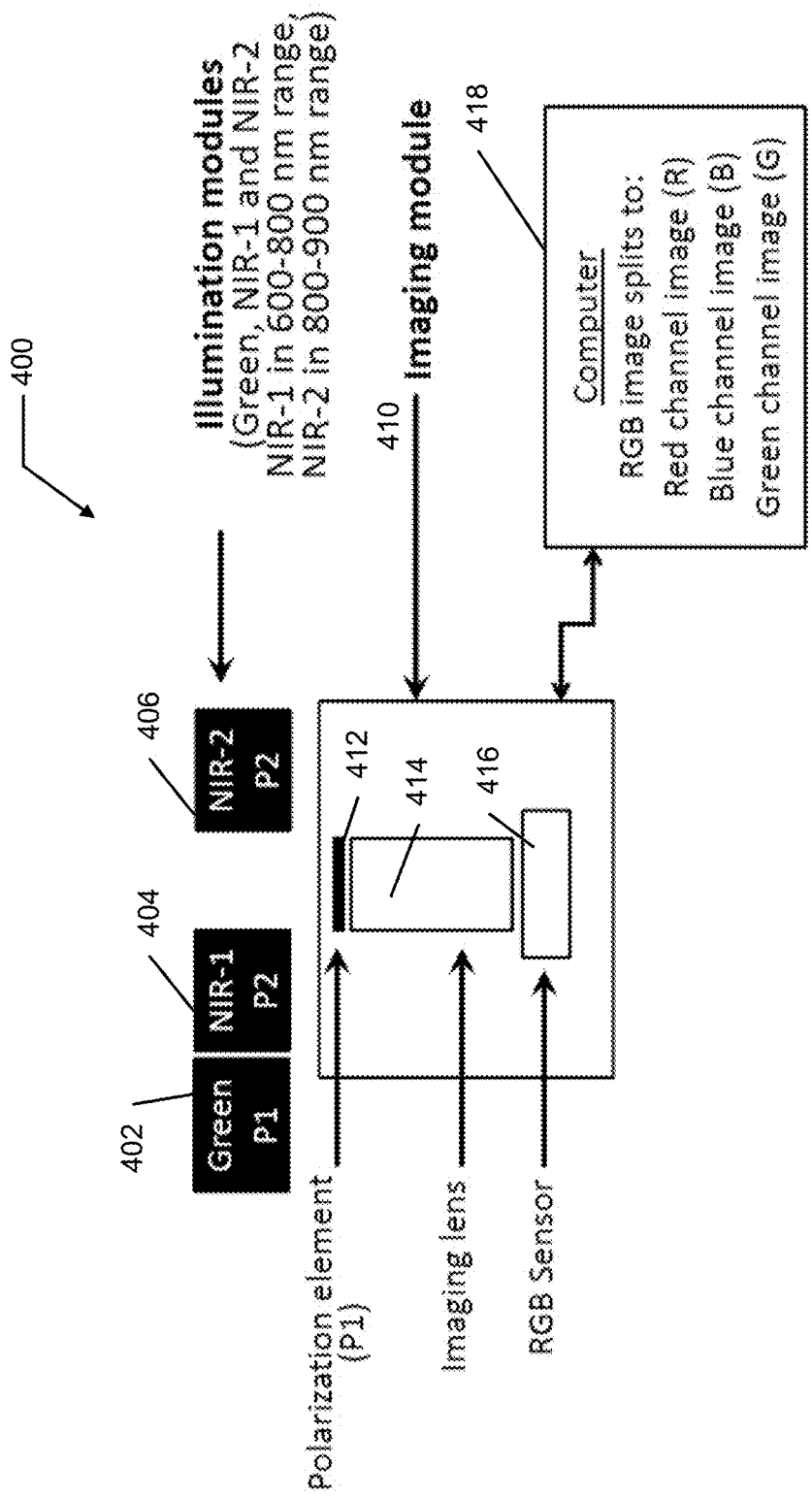
FIG. 9 is a high level diagram of another embodiment of the present disclosure which makes use of one illumination source for providing a green colored illumination, and a pair of NIR illumination sources operating at different wavelengths, which allows information to be captured by a color sensor in each of the red, blue and green spectrums and used for biometric trait detection/verification.
Figure 10:
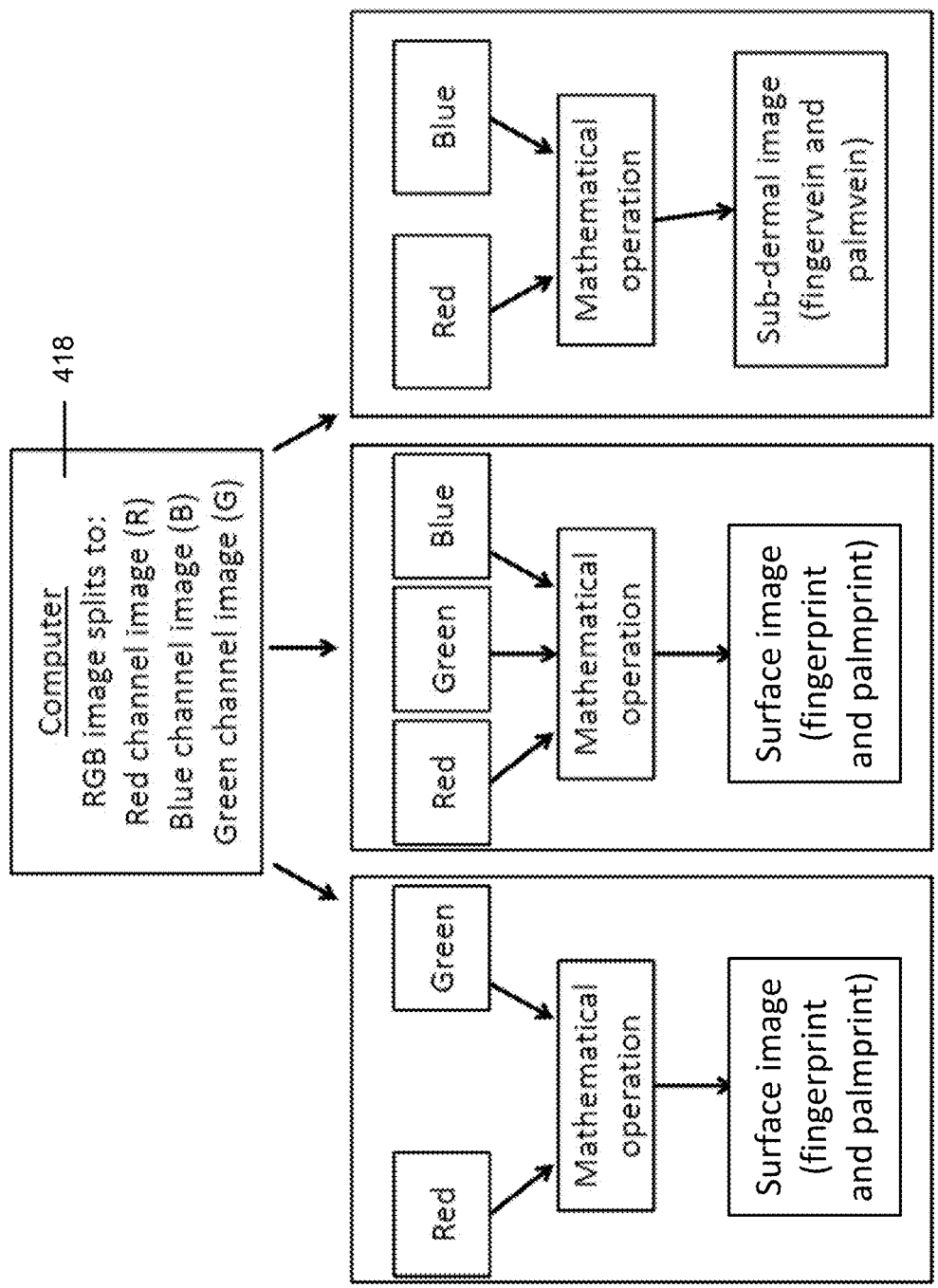
FIG. 10 is a high level diagram showing the operations that the computer of FIG. 9 may perform in obtaining a selected one or more biometric traits.

Referring to FIG. 9, a system 400 incorporating two NIR illumination sources and one non-NIR illumination source is disclosed. This system 400 includes a first illumination source in the form of illumination module 402 for providing illumination at a wavelength to produce green light, a first NIR illumination source in the form of NIR illumination module 404 for producing NIR illumination at a wavelength within the 600 nm-800 nm spectrum, and a second NIR illumination source in the form of NIR illumination module which produces NIR illumination at a wavelength within the 800 nm-900 nm spectrum. The system 400 also makes use of an imaging subsystem in the form of imaging module 410 having a polarization element (P1) 412, an imaging lens 414 and a RGB sensor 416. The output from the imaging lens 414 is provided to a processing subsystem which in one example is a computer 418. The processing of the output from the image sensor 416 can be performed sequentially by the computer 418. The operations performed by the computer 418 are shown in high level form in FIG. 10.

Figure 11:
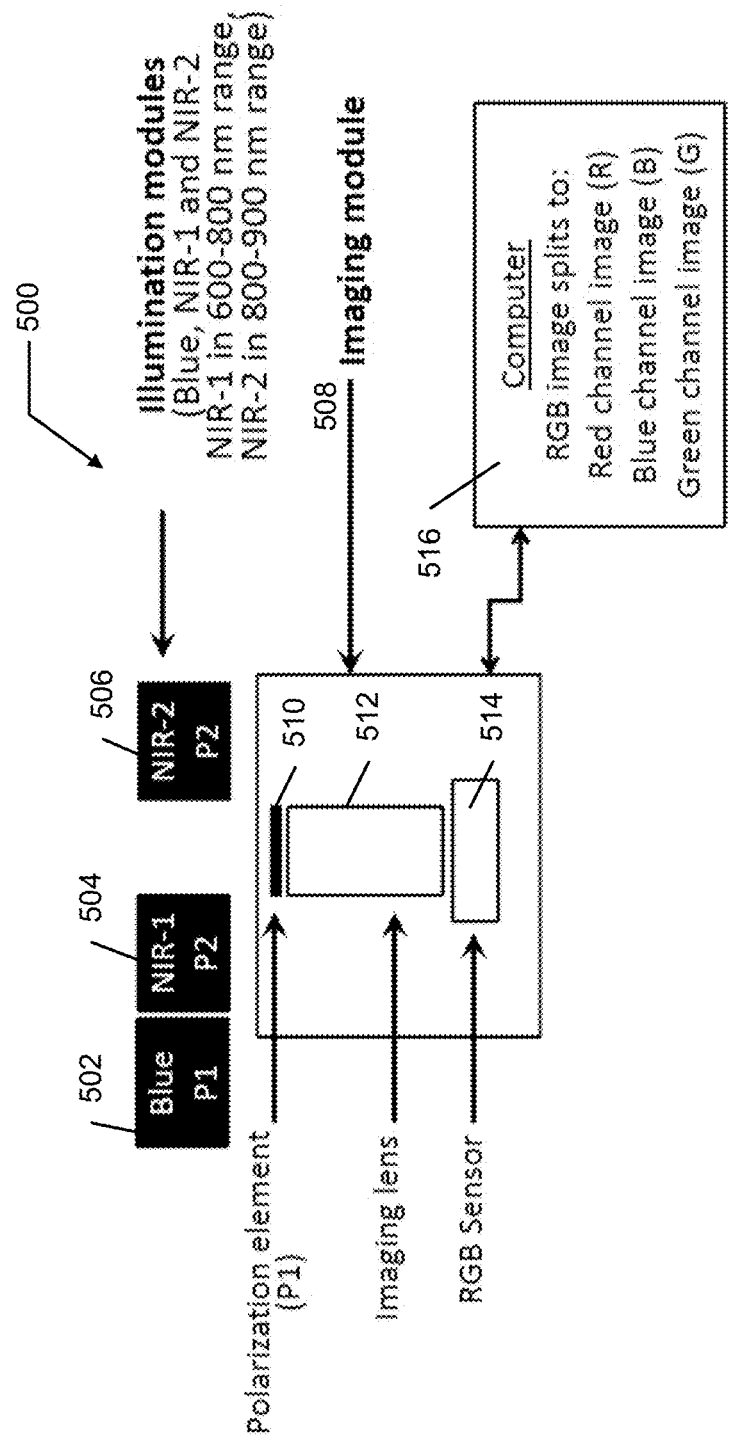
FIG. 11 is a high level diagram showing another embodiment of the present disclosure which makes use of an illumination source that provides an illumination within the blue color spectrum, as well as two NIR illumination sources operating to provide illumination signals at two different NIR wavelengths, which allows information to be captured by a color sensor in each of the red, blue and green spectrums.
Figure 12:
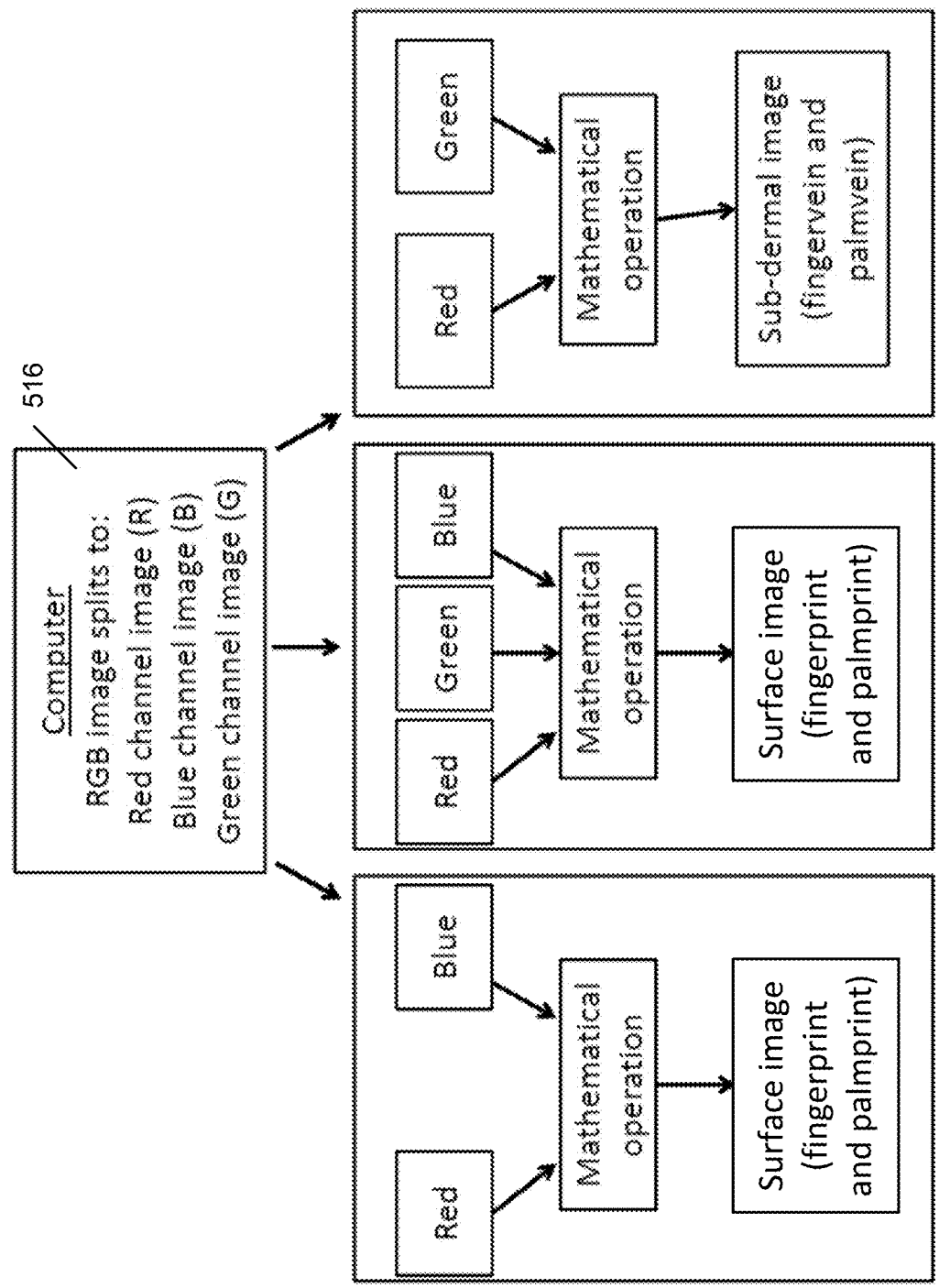
FIG. 12 is a high level diagram showing the operations that the computer of FIG. 11 performs in obtaining selected one or more of the biometric traits.

FIG. 11 illustrates a system 500 in accordance with another embodiment of the present disclosure which makes use of a plurality of illumination sources formed by a first illumination module 502, a first NIR illumination module 504 and a second NIR illumination module 506. The first illumination module may produce an illumination of light within the blue color spectrum with a first polarization (P1), the first NIR illumination module 504 may produce an illumination of light within the 600 nm-800 nm NIR spectrum and with a second (P2) polarization, and the second NIR illumination module 506 may produce an illumination within the 800 nm-900 nm NIR spectrum also with the second polarization (P2). An imaging subsystem in the form of imaging module 508 may include a polarization element (P1), an imaging lens 512 and a sensing subsystem which in one example is an RGB color sensor 514. A processing subsystem, which in one example is a computer 516, may receive the output from the RGB sensor 514 and mathematically split the red (R), blue (B) and green (G) channel images obtained from the RGB sensor 516. It must be noted that system 400 of FIG. 9 and system 500 of FIG. 11 are designed to emphasize an improved detection of the sub-surface image using two NIR modules and a single RGB image acquisition. The rationale for such approach was discussed hereinbefore in connection with the system 300 of FIG. 7.

Upon capturing the image of the biometric trait, an image processing method may be used by the computer 418 or by a different component to generate the biometric template. As mentioned earlier, the methods described in the present disclosure can simultaneously acquire multiple biometric traits such a finger print, a finger-vein, a palm print, a palm-vein, as well as the hand geometry using the palmar side of a human hand. Using the dorsal aspect of a human hand, the dorsal vein pattern as well as the nail and hand geometries can be used as additional information. One can potentially further expand the systems 100-400 to obtain and analyze biometric traits or features for both the left and the right hands. The multiplicity of recorded biometric information can be used in various ways, such as for improved accuracy or for interfacing with multiple databases. However, the systems 100-400 can also be used in some new ways that open new capabilities in the currently known biometric identification toolset. For example, the user (person undergoing identification) can define which biometric trait subset to be used during each biometric identification process. Alternatively, a system administrator can define which biometric subset trait is to be used during each biometric identification process (including random selection).

Still further, new biometric templates can be developed that relate features across different biometric traits. For example, the finger print and finger-vein patterns (or palm print and palm-vein) can be simultaneously considered to define cross correlated features for the extraction of the biometric template. This gives additional layers of information to improve accuracy. In addition, developing templates that compare the features of one biometric trait with those of another, the hand would not be needed to be in a particular fixed geometry with respect to the imaging module, such as the palm surface being parallel to the image plane of the imaging module. The most characteristic aspect of each set of biometric traits can be used for each person, thus using the selected biometric traits that can be most efficiently extracted for each person. This may be one of two or more subsets for each biometric trait, but by combining the different subsets there is sufficient information for the unique identification of a person.

A sequence of biometric raw images can be used using the same system but different methods such as the example discussed earlier and depicted in FIG. 9. There is a number of ways different biometric raw images can be acquired sequentially. It must also be noted that a combination of sequential acquisition of two or more images based on the systems 200, 300, 400 and 500 are potentially advantageous and represents part of the teachings of the present disclosure. While the examples show a single RGB sensor being used, it will be appreciated that more than one sensor may be employed to obtain the acquired images to be used by the computer system for processing purposes.

An image before the illumination sources are turned on can be acquired and can be subtracted from the image recorded after the illumination sources are turned on in order to remove the image information arising from the ambient lighting (background). This may improve the quality of the resulting images capturing the specific biometric traits.

It should be emphasized that the various embodiments of the present disclosure described herein for the acquisition and utilization of multiple biometric traits, when employed for identification purposes, each make it extremely difficult to use a fabricated object(s) to obtain unauthorized access. However, additional elements can be incorporated (built in to) into the various embodiments to enhance the ability of each to detect such fabricated objects. Such an extra layer of protection could be formed by configuring the system to use multiple wavelengths for illumination. As a result, the (normalized) ratio of the intensities of images of different wavelengths represent spectroscopic information of the presence of a human with a specific tissue structure and biochemical composition, for example an amount of melanin and fatty tissue. The various embodiments described herein can further be augmented by incorporating a simple spectroscopy system to analyze the reflected light (preferably the cross polarized component) as a function of wavelength. This will require the addition of a white light source and some type of spectroscopic analysis over a relatively broad spectrum. Methods to detect the presence of blood flow and/or oxygenation similar to that pulse oximetry (but via noncontact means), as well as methods to detect temperature variations, may also be implemented using the systems and teachings of the present disclosure. Other non-invasive and non-contact analytical methods are possible such as Raman scattering and Infrared spectroscopy based methods.

Referring now to FIGS. 13-16, an apparatus 600 is shown which forms a computing tablet-like device for performing acquisition and analysis of various surface and subsurface anatomic structures that provide biometric information which can be used to help verify an individual's identify, or to identify an individual. Such biometric information may include, but is not necessarily limited to, finger veins, palm veins, fingerprints and palm prints, overall hand geometry, or vascular structures in other parts of the hand or human body such as the arm, wrist, back of the hand or possibly blood vessel patterns in an individual's eye.

In FIGS. 13-15 the apparatus 600 is shown having the form factor (e.g., height, width, thickness and weight) of a computing tablet. The apparatus 600 includes a housing 602 having a bezel 604. A high resolution touchscreen display 606 is located in housing 602 and surrounded by the bezel 604. As is visible in FIG. 13, the bezel 604 may include a front camera 608 which forms an imaging module identical or similar to imaging module 110 discussed in connection with FIG. 3. A plurality of illumination modules 610a-610d, along with one or more speakers 612, a microphone 613, an On/Off button 614, and a DC charging port 616 may also be constructed in the bezel 604. The illumination modules 610a-610d may be constructed identical or substantially identical to the illumination modules 102-108, respectively, shown in FIG. 3. The illumination modules 610a-610d thus provide illumination at wavelengths $\lambda 1$, $\lambda 2$, $\lambda 3$ and $\lambda 4$ (or otherwise relatively narrow spectral bands). FIG. 14 illustrates a rear panel portion 618 of the housing 602. The rear panel portion 618 may include a rear facing camera 620, which forms an imaging module similar or identical to imaging module 110. Illumination modules 622a-622d, similar or identical to illumination modules 610a-610d, may be housed in the rear panel portion 618. It will be appreciated that the apparatus 600 only requires one set of illumination modules (i.e., either 610a-610d or 622a-622d) for operation, although providing both sets of the illumination modules 610a-610d and 622a-622d enables the user to illuminate the anatomy being analyzed while holding the apparatus 600 with either the touchscreen 606 side facing the anatomy or the rear panel portion 618 facing the anatomy. In practice, it is expected that most implementations of the apparatus 600 will only incorporate the illumination modules 622a-622d on the rear panel portion 618, as this allows the user to easily view a real time image of the anatomy being imaged on the touchscreen 606 while using the apparatus 600 to perform the imaging process. Similarly, it is expect expected that only camera 620 may be used to form the imaging module. In such a configuration, then camera 608 may be used as a conventional, front facing camera for conventional still pictures and videos. Alternatively, the illumination modules 622a-622d and the camera 620 may all be located along a side edge of the housing 602, which would allow images to be obtained at a 90 degree angle relative to the touchscreen display 606. Depending on the shape of the housing 602, it may also be possible to arrange the illumination modules 622a-622d and the camera 620 on the housing so that images can be obtained at some angle between 0 degrees and 90 degrees relative to the touchscreen display 606.

It is expected that an implementation of three or four illumination modules 622a-622d will be preferred in many applications. In one specific embodiment using three illumination modules 622a-622d, the illumination modules may have a green color wavelength, a blue color wavelength and a NIF (850 nm) wavelength. The images are then recorded by the camera 620, which in one example is an RGB camera (i.e., an RGB sensor), wherein the blue pixels detect the blue color, the green pixels the green color and the red pixels the NIR wavelength. This embodiment thus is able to make use of inexpensive color cameras already developed and incorporated in tablet devices and/or smartphone like devices.

The camera 620 may in one embodiment include either a single, physically integrated sensor or a plurality of independent sensors disposed adjacent from one another. If a plurality of sensors is used, then each sensor may be used to image a designated section of the body portion of the anatomy arising from distinct illumination modules. The individual images may then be electronically (i.e., digitally) combined in a subsequent operation to make a single image and subsequently one or more numerical formulations (biometric tablets).

It will be appreciated that the locations of the camera 620 and the illumination modules 622a-622d are merely intended to show one embodiment of a suitable configuration of such components, and it is possible that the locations of these components could be varied on the housing 602. Optionally, it is also possible that two or more groups of illumination modules 622-622d could be located at different locations on the housing 602 to better handle illumination of a wide range of anatomical features of different sizes. The use of two groups of illumination modules 622a-622d, however, would allow optimal illumination beam patterns to be selected for anatomical features that differ widely in area, for example a human palm versus a human eye.

The rear panel 618, while shown as having only a single rear facing camera 620, may include more than one camera. For example, a second camera could be housed in the rear panel portion 618 which is a conventional camera for taking still pictures or videos.

It is also an option that an independent subsystem could be provided which forms both an illumination module and an imaging module, and which is retrofittable onto a housing of an existing computing tablet or smartphone. By "existing" it is meant a tablet that is already being mass produced and commercially available for purchase, such as those available from Samsung Electronics and Apple Inc. If the existing tablet has a serial port or even a USB port, then the necessary means for enabling communication between the processor of the tablet (or smartphone) and the independent subsystem may be available. If the tablet (or smartphone) does not have any physical interface port, but does have a short range, low power radio (e.g., Bluetooth® protocol or ZigBee® protocol radio), it would be possible to communicate using this means as long as the independent imaging module is provided with a corresponding radio. A suitable application program would also need to be installed on the existing tablet for allowing control and use of the independent imaging module.

Figure 16:
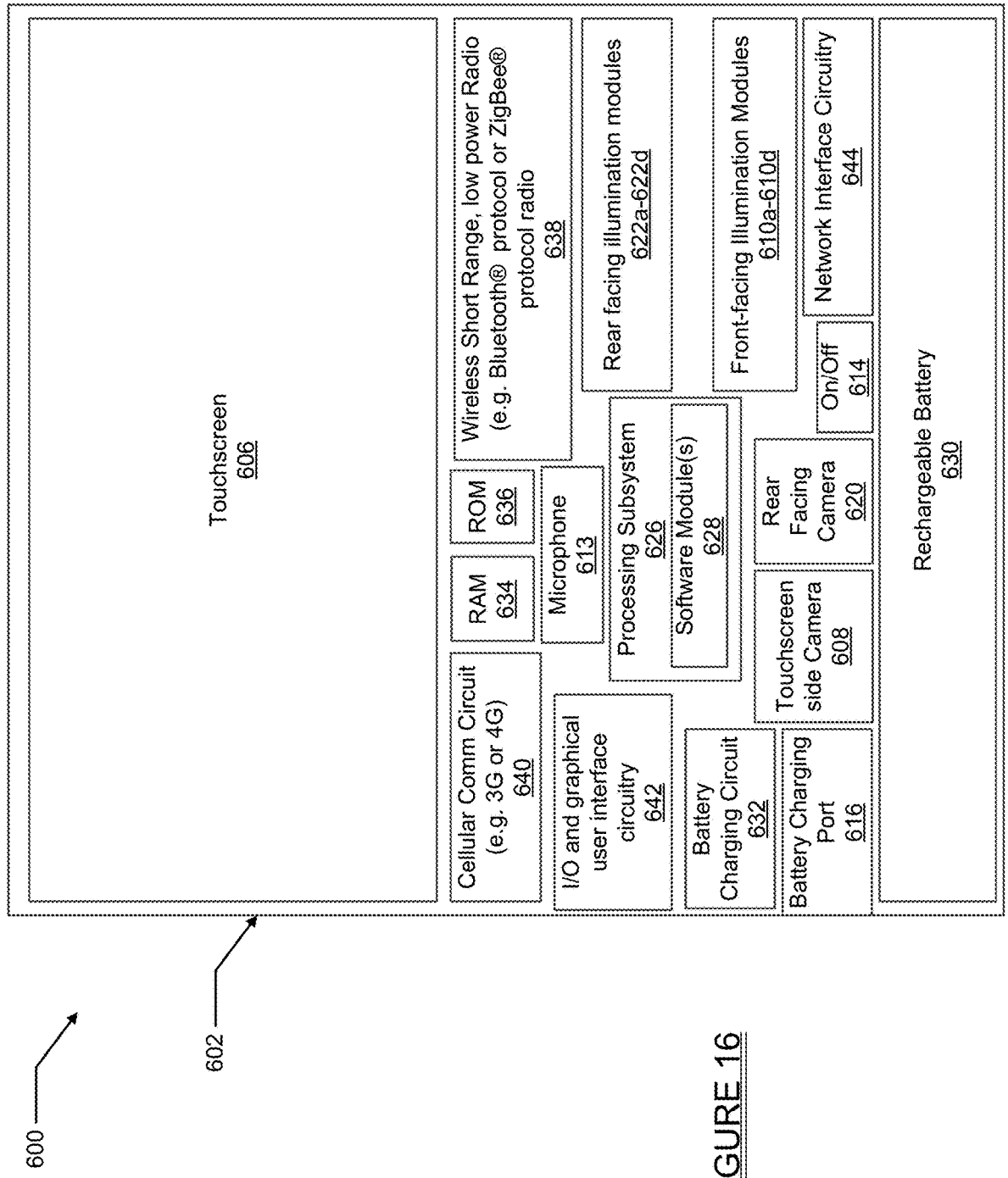
FIG. 16 is a high level block diagram of various subsystems which are used to form the apparatus of FIG. 13.

FIG. 16 shows a high level block diagram of various subsystems that may be incorporated in the housing 602 of the apparatus 600. In addition to the touchscreen 606, the apparatus 600 may include a processing subsystem 626 which runs one or more software modules 628 stored in the processor's internal memory. A rechargeable DC battery 630 may also be housed within the housing 602 for powering the various components and subsystems of the apparatus 600. A battery charging circuit 632 may be included for allowing an external battery charger (not shown), which is coupled to the battery charging port 614, to deliver a charging current to the DC battery 630. The processing subsystem 626 may also be in communication with a random access memory (RAM) 634 and a read only memory (ROM) 636. A wireless, short range, low power radio 638 (e.g., Bluetooth® protocol or ZigBee® protocol radio) may be incorporated to enable a short range wireless link to be established with a local area network in the vicinity of the apparatus 600. Optionally, a cellular communications circuit (e.g., 3G or 4G) 640 may be incorporated to enable direct communications with a cellular service provider. An I/O and graphical user interface (GUI) circuit 642 may be included to handle communications between the processing subsystem 626 and the above-described electronic subsystems of the apparatus 600, as well as the touchscreen display 606. A network interface circuit 644 may be included to establish a link with a local area network or a WiFi access point.

The software module(s) 628 may comprise one or more suitable application programs for implementing a menu driven control scheme which allows the user to control and use the apparatus through touch commands made on the touchscreen 606. The commands may include commands to turn off the apparatus 600, to select which camera 608 or 620 to use, to select which group of illumination modules 610a-610d or 622a-622d to use to capture an image and initiate an identity verification process. The image captured may be presented on a window on the touchscreen 608 along with suitable touch controls for saving the acquired image. Optional touch slider controls, well known with touchscreen devices, may be implemented for adjusting features of each camera (e.g., focal length, aperture, image contrast, magnification, pixel resolution etc.). Images taken using either of the cameras 608 or 620 may be stored to the internal RAM 634. Optionally, the images obtained may be transmitted to a remote subsystem (e.g., remotely located server) using the wireless, short range, low power internal radio 638 or possibly by using the cellular communications circuit 640. The acquisition of the image and its analysis may be performed by the processing subsystem 626 using the techniques and methodologies described herein in connection with the discussion of the subject matter of FIGS. 1-12.

If the apparatus 600 is being used to verify the identities of various individuals, then it may be necessary to record biometric information (e.g., palm vein, eye vascular structure, etc.) for each individual in the RAM 634 of the apparatus 600, along with the name of the individual and any other pertinent information. This enables the apparatus 600 to provide on-the-spot verification of an identify of an individual. Possibly two or more biometric traits of the individual could be analyzed and compared by the apparatus 600. For example, palm vein or palmprint, or fingervein or fingerprint could be analyzed. Alternatively, one or more fingers, or possibly a vascular structure from another body part, or multiple combinations of biometric traits, could be analyzed, to provide even higher accuracy in the verification process. Since the acquisition and analysis of obtained images is performed by the processing subsystem 626 in real time, results can be provided to a user of the apparatus 600 in a matter of seconds or less. The results may take the form of information as to the individual's name, level of security clearance, or any other pertinent information that the user may need to know.

FIGS. 17 and 18 show another embodiment of the present disclosure where an image acquisition and analysis apparatus 600', having a form factor of a smartphone (i.e., implemented in a smartphone), is shown. The apparatus 600' may otherwise be functionally identical to the apparatus 600. The apparatus 600' has component parts identical to those described for the apparatus 600 denoted with the same reference numbers used to describe the apparatus 600 but including a prime "'" designation. The apparatus 600' also has a conventional function button 646' to enable the user to switch between different screens, as is conventional with most smartphones. The internal components of the apparatus 600' may be identical or substantially identical to those shown in FIG. 16 for the apparatus 600.

Also note that a verification operation to verify the user of the apparatus 600 may be performed locally at the instrument (i.e., at the apparatus 600) level. This would enable the apparatus 600 or 600' to "know" who is using it, and only then to allow an action such as access to data or allow a transaction via the web using the apparatus 600/600'. Verification can also be done by transmitting information to a remote data center. It is expected that in most applications it will be unlikely (but possible) that the apparatus 600/600' will be used to transmit any images (acquired or constructed) to the data center for security reasons. Instead, current biometric technologies utilize algorithms to convert images to digital data (template) that are not convertible to original images. The digital data can be securely transmitted for identity verification without the security concerns that would otherwise be present when transmitting actual acquired or constructed images. It is preferred that an initial registration by a user to a local database or a remote data base, whichever is being used for communications purposes, will be required.

The apparatus 600 and the apparatus 600' of the present disclosure enable an individual to easily carry and use the apparatus 600/600' in the field. As such, the analysis of biometric features of an individual may be obtained essentially wherever it is convenient to do so. The apparatus 600/600' may be used remotely from a secure building, or may be easily carried by an individual to various rooms within a building or other structure where on-the-spot identification of biometric features needs to be performed to identify various individuals, or to confirm the identity of various individuals. A significant advantage is that the apparatus 600 and the apparatus 600' obtains the biometric traits of interest without the need to physically contact the anatomy of the person being imaged.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A hand holdable, portable apparatus for simultaneously imaging first and second differing biometric traits associated with an anatomy of a person comprising a finger or a palm without physical contact with the anatomy, the apparatus comprising:

a housing;

a touchscreen display mounted in the housing;

first, second, third and fourth illumination modules disposed on the housing, that illuminate a portion of an anatomy of a person while holding the housing over the anatomy being imaged;

the first illumination module providing illumination at a first wavelength in a blue or green spectral region, the second illumination module providing illumination at a second wavelength in the blue or green spectral region, the third illumination module providing illumination at a third wavelength in a red or near infrared spectral region and the fourth illumination module providing illumination at a fourth wavelength in the red or near infrared spectral; and the first illumination module providing illumination using a first polarization, the second illumination module providing illumination at a second polarization that is orthogonal to that of the first polarization, the third illumination module providing illumination at a third polarization that is orthogonal to that of the first polarization, and the fourth illumination module providing polarization at a fourth polarization that is orthogonal to that of the first polarization;

an imaging module forming a camera located on the housing and forming an imaging subsystem comprised of a single lens and equipped with a single polarization element through which returning light from all of the first, second, third and fourth illumination modules pass after interacting with portion of an anatomy of a person, the polarization element providing parallel polarization with the first polarization;

the camera further configured to simultaneously create first, second, third and fourth image components therefrom that maintain spatial co-registration of features of the anatomy;

the first image component capturing blue spectral components reflected from the portion of the anatomy at the first polarization;

the second image component capturing the green spectral components reflected from the portion of the anatomy at the first polarization;

the third image component capturing the red and near infrared spectral components reflected from the portion of the anatomy at the first polarization;

a computer which processes two of the image components using a first mathematical operation in order to create a first new image that highlights a first biometric trait, comprising a fingerprint or a palm print;

and which processes another two of the image components using a second mathematical operation in order to create a second image that highlights a second biometric trait, comprising finger veins or palm veins.

2. The apparatus of claim 1, wherein the first, second, third and fourth illumination modules are arranged on the housing to circumscribe the camera.

3. The apparatus of claim 1, further comprising:
a bezel surrounding the touchscreen display and forming a portion of the housing;
an additional plurality of illumination modules disposed in the bezel; and
an additional camera disposed in the bezel for obtaining images using the additional plurality of illumination modules.

4. The apparatus of claim 1, wherein:
the apparatus has a form factor similar to at least one of a computing tablet or a smartphone;

wherein the biometric trait further includes at least one of a, hand geometry, an arm, a wrist, a back of hand and a vascular structure of an eye.

5. A hand holdable, portable apparatus for simultaneously imaging first and second biometric traits of a portion of an anatomy of a person, without physical contact with the anatomy, the apparatus comprising:
a housing;
a first illumination module disposed on the housing that provides a first illumination of the portion of the anatomy of the person at a first wavelength in a blue or green spectral region, and having a first polarization;
a second illumination module disposed on the housing that provides a second illumination of the portion of the anatomy of the person at a second wavelength in the blue or green spectral region, and having a second polarization, the second wavelength being different from the first wavelength;
a third illumination module disposed on housing that provides a third illumination of the portion of the anatomy of the person, and having the second polarization, the third illumination being of a third wavelength in a red or near infrared spectral region which is different from both of the first and second wavelengths;
an imaging module having a single lens, a polarization element having a first polarization, and an image sensor for simultaneously capturing first, second, and third color image components corresponding to the first, second, and third wavelength respectively; and
a computer which processes the three color image components using a first mathematical operation in order to create a first new image that highlights a first biometric trait, comprising a fingerprint or a palm print;
and which processes at least the third color image component using a second mathematical operation in order to create a second image that highlights a second biometric trait, comprising finger veins or palm veins.

6. The apparatus of claim 5, wherein:
the wavelengths include a green color wavelength, a blue color wavelength and a NIR wavelength in the wavelength range between about 650 nm and 1550 nm, which form the image components that are recorded by the imaging module;
the imaging module comprising an RGB camera, and wherein blue pixels of the RGB camera detect mainly the blue color wavelength, green pixels of the RGB camera detect mainly the green color, and red pixels of the RGB camera detect mainly the red or NIR wavelength.

7. The apparatus of claim 5, further comprising:
a bezel circumscribing the touchscreen display and forming a portion of the housing.

8. The apparatus of claim 7, wherein the bezel includes:
an additional camera forming an additional imaging module; and
an additional plurality of illumination modules.

9. The apparatus of claim 5, further comprising a fourth illumination module disposed on the housing.

10. The apparatus of claim 5, where each one of the plurality of acquired images are acquired by configuring the sensor system of the image module with a plurality of sensors, with each said sensor being configured to obtain one of the acquired images while enable spatial co-registration of the image components; and
wherein the sensor system includes at least one of:
a single, physically integrated sensor; or a plurality of independent sensors disposed adjacent from one another, that all capture the image of the same designated section of a body portion of the anatomy.

11. The apparatus of claim 10, wherein the sensor system comprises an RGB sensor.

12. The apparatus of claim 5, wherein at least one of:
the first and second illumination modules comprise wavelengths in a visible spectral range; or
the first and second illumination modules are comprised of the same wavelength in a visible spectral range but have orthogonal polarization states.

13. The apparatus of claim 5, wherein the third illumination module is comprised of at least one wavelength or spectral band in the 650 nm to 1550 nm spectral range.

14. The apparatus of claim 5, wherein:
the apparatus has a form factor similar to at least one of a computing tablet or a smartphone.

15. A method for forming a hand holdable, portable apparatus for imaging a portion of an anatomy of a person comprising a finger or a palm, without physical contact with the anatomy and without injecting or applying contrast enhancing agents into or onto the anatomy, the method comprising:
providing a housing;
disposing a touchscreen display in the housing;
arranging a plurality of at least first, second, and third illumination modules on the housing to provide at least first, second and third illuminations of the portion of the anatomy of the person at a plurality of different wavelengths and polarizations;
the first illumination module providing illumination at a first wavelength in a blue or green spectral region,
the second illumination module providing illumination at a second wavelength in the blue or green spectral region,
the third illumination module providing illumination at a third wavelength in a red or near infrared spectral region; and
the second and third illumination modules each using a polarization that is orthogonal to a polarization used by the first illumination module;
arranging a camera comprised of a single lens and equipped with a single polarization element providing a polarization parallel to that used by the first illumination module, the camera being housed on the housing, the camera forming an imaging subsystem for simultaneously capturing the illumination reflected from the anatomy in a first, second, and third image components corresponding to the first, second, and third wavelength respectively;
using a computer to process a first subset of the image components using a first mathematical operation in order to create a first new image that highlights a first biometric trait, comprising a fingerprint or a palm print;
and to process a second subset of the image components using a second mathematical operation in order to create a second image that highlights a second biometric trait, comprising finger veins or palm veins, in order to enable identification of the first and second biometric traits.

* * * * *